United States Patent
Clark et al.

(10) Patent No.: US 11,335,055 B2
(45) Date of Patent: May 17, 2022

(54) INTERSECTION TESTING IN RAY TRACING SYSTEMS WITH SKIPPING OF NODES IN SUB-TREES OF HIERARCHICAL ACCELERATION STRUCTURES

(71) Applicant: Imagination Technologies Limited, Kings Langley (GB)

(72) Inventors: Gregory Clark, Hemel Hempstead (GB); Steven J. Clohset, San Francisco, CA (US)

(73) Assignee: Imagination Technologies Limited, Kings Langley (GB)

( * ) Notice: Subject to any disclaimer, the term of this patent is extended or adjusted under 35 U.S.C. 154(b) by 0 days.

(21) Appl. No.: 16/913,673

(22) Filed: Jun. 26, 2020

(65) Prior Publication Data

US 2021/0407171 A1    Dec. 30, 2021

(51) Int. Cl.
*G06T 15/06* (2011.01)
*G06T 17/00* (2006.01)
*G06T 15/00* (2011.01)

(52) U.S. Cl.
CPC ............ *G06T 15/06* (2013.01); *G06T 15/005* (2013.01); *G06T 17/005* (2013.01); *G06T 2210/21* (2013.01)

(58) Field of Classification Search
CPC combination set(s) only.
See application file for complete search history.

(56) References Cited

U.S. PATENT DOCUMENTS

| | | |
|---|---|---|
| 6,219,061 B1 | 4/2001 | Lauer et al. |
| 7,969,434 B2 | 6/2011 | Peterson et al. |
| 9,460,546 B1 | 10/2016 | Stich et al. |
| (Continued) | | |

OTHER PUBLICATIONS

Kinkelin; "GPU Volume Raycasting using Bounding Interval Hierarchies"; URL: https://www.cg.tuwien.ac.at/research/publications/2009/Kinkelin _ 2009/ Kinkelin _ 2009-Paper. pdf; 15 pages.

(Continued)

*Primary Examiner* — Andrew G Yang
(74) *Attorney, Agent, or Firm* — Potomac Law Group, PLLC; Vincent M DeLuca

(57) ABSTRACT

Hierarchical acceleration structures to be used for intersection testing in a ray tracing system are generated. Nodes of the hierarchical acceleration structure represent regions in a scene, and are linked to form the hierarchical acceleration structure. Data is stored representing the hierarchical acceleration structure defining the regions represented by a plurality of the nodes of the hierarchical acceleration structure. At least one node of the hierarchical acceleration structure is an implicitly represented node, wherein data defining a region represented by an implicitly represented node is not explicitly included as part of the stored data but can be inferred from said stored data. Ray tracing systems and computer-implemented methods perform intersection testing in the ray tracing system in which, based on conditions in the ray tracing system, a determination is made as to whether testing of one or more rays for intersection with a region represented by a particular node of a sub-tree is to be skipped. The one or more rays are tested for intersection in accordance with the determination.

20 Claims, 11 Drawing Sheets

(56) References Cited

U.S. PATENT DOCUMENTS

| | | |
|---|---|---|
| 9,721,320 B2 | 8/2017 | Karras |
| 10,032,289 B2 | 7/2018 | Laine et al. |
| 10,430,099 B2 | 10/2019 | Carter et al. |
| 2009/0138663 A1* | 5/2009 | Lee ............. G06F 12/0815 711/143 |
| 2009/0157997 A1 | 6/2009 | Leonenko |
| 2009/0167763 A1 | 7/2009 | Waechter et al. |
| 2009/0225081 A1* | 9/2009 | Keller ............. G06T 15/06 345/426 |
| 2013/0235049 A1 | 9/2013 | Karras |
| 2014/0270574 A1 | 9/2014 | Asukai et al. |
| 2014/0285488 A1* | 9/2014 | Sevastiyanov ........ G06T 9/001 345/426 |
| 2014/0333623 A1 | 11/2014 | Ozdas et al. |
| 2015/0261833 A1 | 9/2015 | Blaas |
| 2017/0116760 A1 | 4/2017 | Laine et al. |
| 2017/0178387 A1* | 6/2017 | Woop ............. G06T 15/06 |
| 2017/0287100 A1* | 10/2017 | Liktor ............. G06F 12/0871 |
| 2018/0373809 A1 | 12/2018 | Ylitie et al. |
| 2019/0057539 A1* | 2/2019 | Stanard ............. G06T 17/005 |
| 2019/0147638 A1 | 5/2019 | Howson et al. |
| 2021/0304484 A1* | 9/2021 | Saleh ............. G06T 15/06 |

OTHER PUBLICATIONS

Ernst et al; "Multi Bounding Volume Hierarchies"; IEEE/EG Symposium on Interactive Ray Tracing; 2008 pp. 35-40.

Fabianowski et al; "Compact BVH Storage for Ray Tracing and Photon Mapping"; URL: http://www.fabianowski.eu/research/egie2009; pp. 1-8.

Pinto et al; "Adaptive Collapsing on Bounding Volume Hierarchies for Ray-Tracing"; URL: https:// di glib. eg. org/xmlui/bitstream/handle/10 .2312/ egsh.20101051. 073-076/073-076.pdf?sequence=I; pp. 1-4.

* cited by examiner

INTERSECTION TESTING IN RAY TRACING SYSTEMS WITH SKIPPING OF NODES IN SUB-TREES OF HIERARCHICAL ACCELERATION STRUCTURES

FIELD

The present disclosure is directed to hierarchical acceleration structures for use in ray tracing systems.

BACKGROUND

Ray tracing is a computational rendering technique for rendering an image of a scene by tracing paths of light ('rays') through the scene, e.g. from a viewpoint from which the image of the scene is being rendered. A ray can be modelled as originating from the viewpoint and passing through a pixel of a rendering space into the scene. A ray that originates from the viewpoint is referred to as a "primary ray". As a ray traverses the scene it may intersect one or more objects within the scene. The interaction between a ray and an object it intersects can be modelled to create realistic visual effects. For example, in response to determining an intersection of a ray with an object, a shader program (i.e. a portion of computer code) may be executed in respect of the intersection. A programmer can write the shader program to define how the system reacts to the intersection which may, for example cause one or more further rays (referred to as "secondary rays) to be emitted into the scene, e.g. to represent a reflection of the ray off the intersected object or a refraction of the ray through the object (e.g. if the object is transparent or translucent). As another example, the shader program could cause one or more rays to be emitted into the scene for the purposes of determining whether the object is in shadow at the intersection point. The result of executing the shader program (and processing any relevant secondary rays) can be the calculation of a rendered value (e.g. a colour value) for the pixel the ray passed through. In this way, rendered values representing the image of the scene can be determined.

In order to reduce the number of intersection tests that need to be performed, ray tracing systems can generate acceleration structures, wherein each node of an acceleration structure represents a region within the scene. Acceleration structures are often hierarchical (e.g. having a tree structure) such that they include multiple levels of nodes, wherein nodes near the top of the acceleration structure (i.e. nodes near the root) represent relatively large regions in the scene (e.g. the root node may represent the whole scene), and nodes near the bottom of the acceleration structure (i.e. nodes near the leaves) represent relatively small regions in the scene. A hierarchical acceleration structure may be referred to as a "hierarchy". Leaf nodes of the acceleration structure represent regions bounding one or more objects in the scene. The acceleration structure can have different structures in different examples, e.g. a grid structure, an octree structure, a space partitioning structure (e.g. a k-d tree) or a bounding volume hierarchy to give some examples. The nodes can represent suitable shapes or regions in the scene (which may be referred to herein as "boxes"). For example, the nodes may represent axis-aligned bounding boxes (AABBs) in the scene.

Intersection testing can be performed for a ray in a recursive manner using the acceleration structure. First, the ray is tested for intersection with the root node of the acceleration structure. If the ray is found to intersect a region represented by a parent node (e.g. the root node), testing then proceeds to the child nodes of that parent node. In contrast, if the ray is found not to intersect a parent node, intersection testing of the child nodes of that parent node can be avoided, thereby saving computational effort. If a ray is found to intersect with a leaf node then it can be tested against the objects within the region represented by the leaf node to thereby determine which object(s) the ray intersects with. If more than one intersection is found for a ray then the closest of the intersection points to the ray's origin (i.e. the first intersection that the ray encounters in the scene) can be identified and the ray is determined to intersect the object at the identified closest intersection. The use of an acceleration structure (rather than testing rays directly with all of the objects in the scene) reduces the number of intersection tests that need to be performed, and simplifies the intersection tests. The intersection tests are simpler because the nodes of the acceleration structure represent basic shapes (e.g. axis-aligned bounding boxes or spheres) for which intersection tests are simpler than for more complex object shapes, e.g. defined in terms of triangular primitives for which the orientation is not predetermined.

FIG. 1 shows a ray tracing system 100 comprising a ray tracing unit 102 and a memory 104. The ray tracing unit 102 comprises a processing module 106, an intersection testing module 108 and processing logic 110. In operation the ray tracing unit 102 receives geometric data defining objects within the 3D scene. The ray tracing unit 102 also receives an indication of a viewpoint from which an image of the scene is to be rendered. The processing module 106 is configured to generate an acceleration structure based on the geometric data, and to send the acceleration structure to the memory 104 for storage therein. After the acceleration structure has been stored in the memory 104, the intersection testing module 108 can retrieve nodes of the acceleration structure from the memory 104 to perform intersection testing of rays against the retrieved nodes. The results of the intersection tests indicate which object in the scene a ray intersects, and the results may also indicate a position on the object at which the ray intersects the object, and may also indicate a distance along the ray that the intersection occurs. The results of the intersection testing are provided to the processing logic 110. The processing logic 110 is configured to process the results of the intersection testing to determine rendered values representing the image of the 3D scene. The rendered values determined by the processing logic 110 can be passed back to the memory 104 for storage therein to represent the image of the 3D scene.

SUMMARY

This summary is provided to introduce a selection of concepts that are further described below in the detailed description. This summary is not intended to identify key features or essential features of the claimed subject matter, nor is it intended to be used to limit the scope of the claimed subject matter.

There is provided a computer-implemented method of performing intersection testing in a ray tracing system for use in rendering an image of a scene, wherein the ray tracing system comprises an intersection testing module comprising a plurality of testing blocks configured to test a ray for intersection with a region in the scene, the method comprising:

receiving data representing part of a hierarchical acceleration structure, wherein the hierarchical acceleration structure comprises nodes, each of which represents a region in the scene, wherein the nodes are linked to form the hierarchical acceleration structure, wherein said part of the hierarchical acceleration structure represents a sub-tree within the hierarchical acceleration structure;

receiving an indication of one or more rays to be tested for intersection with a region represented by a particular node of said sub-tree, wherein the sub-tree comprises descendants of the particular node;

based on conditions in the ray tracing system, determining whether testing of the one or more rays for intersection with the region represented by the particular node of said sub-tree is to be skipped; and testing the one or more rays for intersection, in accordance with said determination, using one or more of the testing blocks of the intersection testing module, wherein said testing the one or more rays for intersection comprises:

if said determination is that testing of the one or more rays for intersection with the region represented by the particular node of said sub-tree is to be skipped, testing the one or more rays for intersection with regions represented by descendants of the particular node at a particular level in the sub-tree, thereby skipping the testing of the one or more rays for intersection with the region represented by the particular node of said sub-tree.

Said testing the one or more rays for intersection may further comprise:

if said determination is that testing of the one or more rays for intersection with the region represented by the particular node of said sub-tree is not to be skipped, testing the one or more rays for intersection with the region represented by the particular node of said sub-tree.

The descendants of the particular node at the particular level in the sub-tree may be the children of the particular node in the sub-tree. The descendants of the particular node at the particular level in the sub-tree may be the grandchildren of the particular node in the sub-tree.

The regions represented by the nodes of the hierarchical acceleration structure may be axis-aligned bounding boxes in the scene.

Said particular node may be an implicitly represented node, wherein data defining a region represented by an implicitly represented node is not explicitly included as part of said received data representing the sub-tree but can be inferred from said received data.

The method may further comprise:

if said determination is that testing of the one or more rays for intersection with the region represented by the particular node of said sub-tree is not to be skipped, inferring the data defining the region represented by the particular node from the received data.

The data defining the region represented by the particular node may not be inferred if said determination is that testing of the one or more rays for intersection with the region represented by the particular node of said sub-tree is to be skipped.

The data defining the region represented by the particular node may be inferred from data in said received data which defines the regions represented by the descendants of the particular node at the particular level in the sub-tree.

The data defining the region represented by the particular node may be inferred by determining, in each dimension of the scene, a minimum and a maximum component of the components defining the axis-aligned bounding boxes represented by the descendants of the particular node at the particular level in the sub-tree.

Said received data representing part of the hierarchical acceleration structure may comprise data indicating how the nodes of the sub-tree are linked, and wherein the data defining the region represented by the particular node may be inferred from said received data using at least some of the data indicating how the nodes of the sub-tree are linked.

Said receiving data representing part of the hierarchical acceleration structure may comprise receiving a data block, wherein the data block may comprise data representing the sub-tree within the hierarchical acceleration structure.

The data block may comprise: (i) data defining the regions represented by the descendants of the particular node at the particular level in the sub-tree, and (ii) data indicating how the nodes of the sub-tree are linked.

The particular level may be the lowest level of the sub-tree.

The data block may comprise data defining regions which are represented by nodes having a shared ancestor in the hierarchical acceleration structure, wherein the data block may comprise an indication of a common origin region representing the region represented by the shared ancestor, and wherein the data defining the regions in the data block which are represented by nodes having the shared ancestor in the hierarchical acceleration structure may comprise, for each of the nodes having the shared ancestor, one or more offsets from the common origin region. The shared ancestor may be a shared parent, a shared grandparent or a shared great grandparent in the hierarchical acceleration structure.

The hierarchical acceleration structure may be built for the scene and stored in a memory before the intersection testing commences for rendering the image of the scene, wherein said receiving data representing part of the hierarchical acceleration structure may comprise reading said data representing part of the hierarchical acceleration structure from the memory.

The size of the data block may match the minimum burst size of the memory.

Said determining whether testing of the one or more rays for intersection with the region represented by the particular node of said sub-tree is to be skipped may be performed dynamically during an intersection testing phase of rendering the image of the scene in the ray tracing system.

The method may further comprise:

monitoring an amount of data that is received representing parts of the hierarchical acceleration structure; and monitoring a processing load on the testing blocks of the intersection testing module; wherein said conditions in the ray tracing system comprise the monitored amount of data and the monitored processing load.

Said determining whether testing of the one or more rays for intersection with the region represented by the particular node of said sub-tree is to be skipped may comprise:

determining an indication of how many of the testing blocks of the intersection testing module would be idle if the one or more rays are tested for intersection with the region represented by the particular node of said sub-tree; and comparing the determined indication to a threshold.

Said conditions in the ray tracing system may comprise one or more of:
- a number of rays to be tested for intersection with the region represented by the particular node of said sub-tree;
- a level of coherence of rays to be tested for intersection;
- a processing load on the testing blocks of the intersection testing module;
- an amount of work in a queue of work for the testing blocks;
- a number of testing blocks of the intersection testing module; and
- an amount of data received from a memory from which said data representing part of the hierarchical acceleration structure is read.

Results of said testing the one or more rays for intersection may be used for determining rendered values representing the image of the scene.

Said one or more rays may be grouped into a packet to be tested for intersection with one or more regions represented by one or more nodes of the hierarchical acceleration structure which are received in a data block.

There is provided a method of rendering an image of a scene in a ray tracing system comprising:
- generating and storing a hierarchical acceleration structure;
- performing intersection testing according any of the methods described herein using part of the generated hierarchical acceleration structure; and
- executing one or more shader programs to process results of the intersection testing to determine rendered values representing the image of the scene.

There is provided an intersection testing module configured to perform intersection testing in a ray tracing system for use in rendering an image of a scene, the intersection testing module comprising:
- receiving logic configured to:
  - receive data representing part of a hierarchical acceleration structure, wherein the hierarchical acceleration structure comprises nodes, each of which represents a region in the scene, wherein the nodes are linked to form the hierarchical acceleration structure, wherein said part of the hierarchical acceleration structure represents a sub-tree within the hierarchical acceleration structure; and
  - receive an indication of one or more rays to be tested for intersection with a region represented by a particular node of said sub-tree, wherein the sub-tree comprises descendants of the particular node;
- node processing logic configured to determine, based on conditions in the ray tracing system, whether testing of the one or more rays for intersection with the region represented by the particular node of said sub-tree is to be skipped; and
- a plurality of testing blocks configured to test the one or more rays for intersection, in accordance with said determination made by the node processing logic, wherein the intersection testing module is configured to cause the plurality of testing blocks to test the one or more rays for intersection by:
  - if said determination made by the node processing logic is that testing of the one or more rays for intersection with the region represented by the particular node of said sub-tree is to be skipped, testing the one or more rays for intersection with regions represented by descendants of the particular node at a particular level in the sub-tree, thereby skipping the testing of the one or more rays for intersection with the region represented by the particular node of said sub-tree.

Said particular node may be an implicitly represented node, wherein data defining a region represented by an implicitly represented node is not explicitly included as part of said received data representing the sub-tree but can be inferred from said received data, and
wherein the node processing logic may be further configured to:
- infer the data defining the region represented by the particular node from the received data if said determination is that testing of the one or more rays for intersection with the region represented by the particular node of said sub-tree is not to be skipped; and
- skip inferring the data defining the region represented by the particular node if said determination is that testing of the one or more rays for intersection with the region represented by the particular node of said sub-tree is to be skipped.

The receiving logic may be configured to receive the data representing part of the hierarchical acceleration structure as a data block, wherein the data block may comprise data representing the sub-tree within the hierarchical acceleration structure.

The intersection testing module may further comprise a local memory configured to store the received data.

There is provided a ray tracing system configured to render an image of a scene, the ray tracing system comprising:
- a processing module configured to generate a hierarchical acceleration structure;
- an intersection testing module as described herein configured to use part of the generated hierarchical acceleration structure to perform intersection testing; and
- processing logic configured to execute one or more shader programs to process results of the intersection testing to determine rendered values representing the image of the scene.

There is provided an intersection testing module or a ray tracing system configured to perform any of the methods described herein.

There is described herein a computer-implemented method of generating a hierarchical acceleration structure to be used for intersection testing in a ray tracing system, the method comprising:
- determining nodes of the hierarchical acceleration structure, wherein each of the nodes represents a region in a scene, and wherein the nodes are linked to form the hierarchical acceleration structure; and
- storing data representing the hierarchical acceleration structure, wherein said stored data comprises data defining the regions represented by a plurality of the nodes of the hierarchical acceleration structure,
wherein at least one node of the hierarchical acceleration structure is an implicitly represented node, wherein data defining a region represented by an implicitly represented node is not explicitly included as part of said stored data but can be inferred from said stored data.

There is described herein a processing module configured to generate a hierarchical acceleration structure to be used for intersection testing in a ray tracing system, the processing module being configured to:
- determine nodes of the hierarchical acceleration structure, wherein each of the nodes represents a region in a scene, and wherein the nodes are linked to form the hierarchical acceleration structure; and cause data representing the hierarchical acceleration structure to be stored, wherein said stored data comprises data defining the regions represented by a plurality of the nodes of the hierarchical acceleration structure, wherein at least one node of the hierarchical acceleration structure is an implicitly represented node, wherein data defining a region represented by an implicitly represented node is not explicitly included as part of said stored data but can be inferred from said stored data.

There is described herein a computer-implemented method of performing intersection testing in a ray tracing system for use in rendering an image of a scene, the method comprising:

receiving data representing at least part of a hierarchical acceleration structure, wherein the hierarchical acceleration structure comprises nodes, each of which represents a region in the scene, wherein the nodes are linked to form the hierarchical acceleration structure, wherein said received data comprises data defining the regions represented by a plurality of the nodes of the hierarchical acceleration structure, and wherein the hierarchical acceleration structure comprises an implicitly represented node, wherein data defining a region represented by the implicitly represented node is not explicitly included as part of said received data but can be inferred from said received data;

inferring, from said received data, data defining the region represented by the implicitly represented node; and performing intersection testing on rays in the scene by testing the rays for intersection with regions represented by nodes of the hierarchical acceleration structure, wherein said performing intersection testing on rays in the scene comprises using the inferred data to test the rays for intersection with the region represented by the implicitly represented node of the hierarchical acceleration structure.

There is described herein an intersection testing module configured to perform intersection testing in a ray tracing system for use in rendering an image of a scene, the intersection testing module comprising:

receiving logic configured to receive data representing at least part of a hierarchical acceleration structure, wherein the hierarchical acceleration structure comprises nodes, each of which represents a region in the scene, wherein the nodes are linked to form the hierarchical acceleration structure, wherein said received data comprises data defining the regions represented by a plurality of the nodes of the hierarchical acceleration structure, and wherein the hierarchical acceleration structure comprises an implicitly represented node, wherein data defining a region represented by the implicitly represented node is not explicitly included as part of said received data but can be inferred from said received data;

node processing logic configured to infer, from said received data, data defining the region represented by the implicitly represented node; and one or more testing blocks configured to perform intersection testing on rays in the scene by testing the rays for intersection with regions represented by nodes of the hierarchical acceleration structure, wherein at least one of the one or more testing blocks is configured to use the inferred data to test one or more of the rays for intersection with the region represented by the implicitly represented node of the hierarchical acceleration structure.

There may be provided a computer-implemented method of generating a hierarchical acceleration structure to be used for intersection testing in a ray tracing system, the method comprising:

determining nodes of the hierarchical acceleration structure, wherein each of the nodes represents a region in the 3D scene, and wherein the nodes are linked to form the hierarchical acceleration structure; and storing data for the nodes in data blocks in a memory, wherein a data block comprises data representing a sub-tree within the hierarchical acceleration structure, wherein the sub-tree comprises one or more nodes at a plurality of levels within the hierarchical acceleration structure;

wherein the data block comprises: (i) data defining the regions represented by the nodes at the lowest level of the sub-tree, and (ii) data indicating how the nodes of the sub-tree are linked, and wherein at least one node of the sub-tree which is at a level above the lowest level of the sub-tree is implicitly represented by the data in the data block, such that data defining the at least one region represented by the respective at least one node is not explicitly stored in the data block but can be inferred from: (i) at least some of the data defining the regions represented by at least some of the nodes at the lowest level of the sub-tree, and (ii) at least some of the data indicating how the nodes of the sub-tree are linked.

The "lowest level" of the sub-tree is the level of the sub-tree which is furthest away from the root of the hierarchical acceleration structure. The nodes of the lowest level of the sub-tree have no children in sub-tree.

There may be provided a computer-implemented method of generating a hierarchical acceleration structure to be used for intersection testing in a ray tracing system, the method comprising:

determining nodes of the hierarchical acceleration structure, wherein each of the nodes represents a region in the 3D scene, and wherein the nodes are linked to form the hierarchical acceleration structure; and storing data for the nodes in data blocks in a memory, wherein a data block comprises data representing a sub-tree within the hierarchical acceleration structure, wherein the sub-tree comprises one or more nodes at a plurality of levels within the hierarchical acceleration structure.

The processing modules, intersection testing modules and ray tracing systems described herein may be embodied in hardware on an integrated circuit. There may be provided a method of manufacturing, at an integrated circuit manufacturing system, a processing module, an intersection testing module or a ray tracing system as described herein. There may be provided an integrated circuit definition dataset that, when processed in an integrated circuit manufacturing system, configures the system to manufacture a processing module, an intersection testing module or a ray tracing system. There may be provided a non-transitory computer readable storage medium having stored thereon a computer readable description of a processing module, an intersection testing module or a ray tracing system that, when processed in an integrated circuit manufacturing system, causes the integrated circuit manufacturing system to manufacture an integrated circuit embodying the processing module, the intersection testing module or the ray tracing system.

There may be provided an integrated circuit manufacturing system comprising: a non-transitory computer readable storage medium having stored thereon a computer readable description of a processing module, an intersection testing module or a ray tracing system as described herein; a layout processing system configured to process the computer readable description so as to generate a circuit layout description of an integrated circuit embodying the processing module, the intersection testing module or the ray tracing system; and an integrated circuit generation system configured to manufacture the processing module, the intersection testing module or the ray tracing system according to the circuit layout description.

There may be provided computer program code for performing any of the methods described herein. There may be provided a non-transitory computer readable storage medium having stored thereon computer readable instructions that, when executed at a computer system, cause the computer system to perform any of the methods described herein.

The above features may be combined as appropriate, as would be apparent to a skilled person, and may be combined with any of the aspects of the examples described herein.

BRIEF DESCRIPTION OF THE DRAWINGS

The present invention is described by way of example with reference to the accompanying drawings. In the drawings:

FIG. 2b illustrates a hierarchical acceleration structure used to represent the regions shown in FIG. 2a;

FIG. 7b shows the format of data in a data block in the first example shown in FIG. 7a;

FIG. 8b shows the format of data in a data block in the second example shown in FIG. 8a;

FIG. 9b shows the format of data in a data block in the third example shown in FIG. 9a;

FIG. 10b shows the format of data in a data block in the fourth example shown in FIG. 10a;

FIG. 11b shows regions within a scene represented by the nodes of the sub-tree illustrated in FIG. 11a;

FIG. 12b shows regions within a scene represented by the nodes of the flattened sub-tree illustrated in FIG. 12a;

Figure 1:
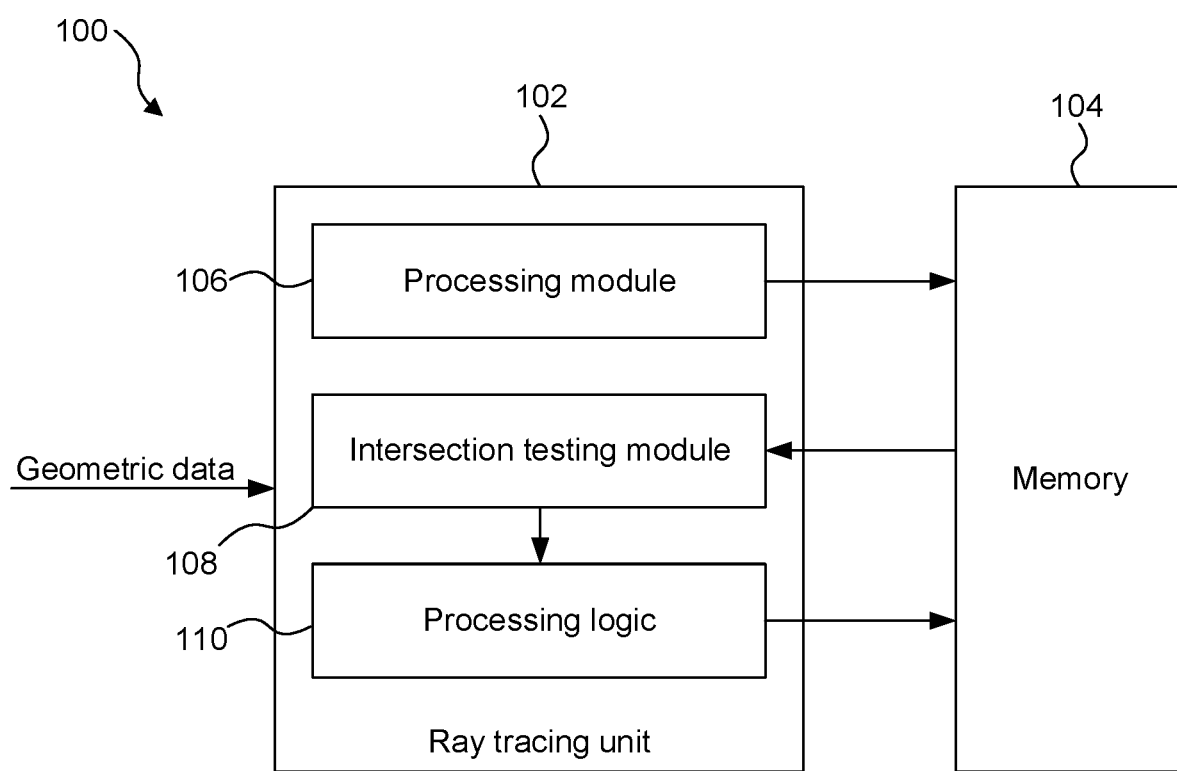
FIG. 1 shows a prior art ray tracing system.

The accompanying drawings illustrate various examples. The skilled person will appreciate that the illustrated element boundaries (e.g., boxes, groups of boxes, or other shapes) in the drawings represent one example of the boundaries. It may be that in some examples, one element may be designed as multiple elements or that multiple elements may be designed as one element. Common reference numerals are used throughout the figures, where appropriate, to indicate similar features.

DETAILED DESCRIPTION

The following description is presented by way of example to enable a person skilled in the art to make and use the invention. The present invention is not limited to the embodiments described herein and various modifications to the disclosed embodiments will be apparent to those skilled in the art. Embodiments are described by way of example only.

Similarly to the ray tracing system 100 described in the background section above, ray tracing systems described herein comprise a ray tracing unit and a memory. The ray tracing unit is configured to generate an acceleration structure and send the acceleration structure to the memory for storage therein. Parts of the acceleration structure can then be read from the memory and used for intersection testing on the ray tracing unit. Results of the intersection testing are used to determine rendered values representing an image of the scene which can then be written back to the memory. The amount of data used to represent an acceleration structure is large, e.g. usually larger than that which can be stored in a memory on the ray tracing unit. This is why the acceleration structure is stored in a separate memory. For example, the memory which stores the acceleration structure may not be physically located on the same chip as the ray tracing unit and may be referred to as an "external memory" or an "off-chip memory". The memory may also be referred to as "system memory" and it may be used to store data for other processing units in the system, e.g. a Central Processing Unit (CPU). Data passing between the ray tracing unit and the memory travels over a communications bus. Compared to the speed at which other operations are performed in the ray tracing unit, writing data to the memory and reading data from the memory are slow operations which consume relatively large amounts of power. Therefore, it can be beneficial (in terms of reducing the latency and power consumption of the ray tracing system) to reduce the amount of data used to represent the acceleration structure, to thereby reduce the amount of data passing between the ray tracing unit and the memory. The rate at which data passes from the memory to the ray tracing unit may be referred to as the "memory bandwidth". Reducing the amount of data used to represent the acceleration structure also reduces the amount of memory that is needed to store the acceleration structure.

In examples described herein, data representing the acceleration structure is stored, wherein at least one node of the acceleration structure is an implicitly represented node. Data defining a region represented by an implicitly represented node is not explicitly included as part of the stored data but can be inferred from the stored data representing the acceleration structure. For example, the acceleration structure may be a hierarchical acceleration structure. A particular node may be an implicitly represented node (i.e. data defining the region represented by the particular node might not be explicitly included in the stored data), but data defining the regions represented by the descendants of the particular node at a particular level in the hierarchical acceleration structure may be stored which can be used to imply (i.e. "infer") the data defining the region represented by the particular node. For example, the descendants of the particular node at a particular level in the hierarchical acceleration structure may be the children of the particular node in the hierarchical acceleration structure. As another example, the descendants of the particular node at a particular level in the hierarchical acceleration structure may be the grandchildren of the particular node in the hierarchical acceleration structure. If intersection testing is to be performed on an implicitly represented node then the ray tracing unit infers the data defining the region represented by the implicitly represented node using some of the data representing the acceleration structure, e.g. using the data defining the regions represented by the descendants of the implicitly represented node at a particular level in the hierarchical acceleration structure. For example, the bounds of a parent node can be inferred using the bounds of the children of the parent node and information about the topology of the hierarchical acceleration structure. The information about the topology of the hierarchical acceleration structure defines how the nodes are linked in the hierarchical acceleration structure, i.e. it defines the relationships between the different nodes in the hierarchical acceleration structure, e.g. as child-parent relationships or sibling relationships.

By not explicitly storing the data defining the regions represented by the implicitly represented nodes, the amount of data that is passed between the ray tracing unit and the memory, and the amount of data that is stored in the memory, is reduced.

Furthermore, even when an acceleration structure is used, the amount of work involved in performing intersection testing in a ray tracing system is still very large. For example, ray tracing may be used for rendering an image of a 3D scene, where the image may have of the order of a million pixels. A primary ray may be traced for each sample position. In some examples, there may be one sample position for each pixel position, whilst in some other examples there may be multiple sample positions for each pixel position (e.g. to allow for processes such as multi-sample anti-aliasing (MSAA) to be performed when rendering the final pixel values). When a ray intersects with an object in the scene, a shader program can be executed which may result in the emission of another ray (i.e. a "secondary ray") into the scene. Each primary ray may result in the emission of many secondary rays, which are all traced through the scene to determine their intersections. Therefore, it would not be unusual for there to be tens or hundreds of millions of rays traced through a scene for rendering an image. The complexity of scenes to be rendered tends to increase as graphics rendering technology develops, so it would not be unusual for there to be thousands of objects in a scene, each of which may be represented by many primitives. Furthermore, the images being rendered may represent frames of a sequence of frames which are to be rendered in real-time, e.g. for display to a user in real-time. For example, the user may be playing a game wherein the rendered images represent a user's view of the 3D scene as the user plays the game. In order for the sequence of frames to appear like a continuous stream of video data, many frames may be rendered per second, e.g. 24, 30 or 60 frames per second to give some examples. It can therefore be appreciated that the work involved in performing intersection testing in a ray tracing system to render scenes to be output in real-time is vast.

One way to overcome this problem, and to perform ray tracing to render scenes to be output in real-time, would be to have one or more supercomputers performing all of the processing. This could be considered to be a 'brute force' approach. However, as well as an aim to have high performance, for performing ray tracing to render scenes to be output in real-time, there are also competing aims of reducing the size (e.g. silicon area) and power consumption of the ray tracing system. For example, there may be an aim to implement the ray tracing system on a mobile device, such as a tablet or smartphone, for which the acceptable size and power consumption may be much lower than for a supercomputer. As such, when designing a ray tracing system, there may be a trade-off between performance, power consumption and area. In some examples described herein, the performance can be increased (i.e. the latency can be reduced) without substantially increasing the power consumption or the area of the ray tracing system.

The intersection testing module may have a plurality of testing blocks, each of which can perform an intersection test to test a ray with a region in the scene. Rays can be grouped together into packets, wherein each of the rays in a packet is to be tested, by a respective testing block of the intersection testing module, for intersection with a region in the scene. The intersection testing process usually has one of two bottlenecks which limits the rate at which the intersection testing can be performed: either (i) the memory bandwidth is the limiting factor, e.g. the rate at which data representing parts of the acceleration structure can be retrieved from memory to be tested against rays is the limiting factor, or (ii) the throughput of the intersection testing module is the limiting factor, e.g. the rate at which the intersection testing module can perform the intersection testing operations is the limiting factor. Which of these two factors is the limiting factor will depend upon conditions (e.g. operating conditions) in the ray tracing system. For example, which of the two factors mentioned above is the limiting factor may depend upon the distribution of the rays which are being tested for intersection. If the rays to be tested for intersection are relatively coherent then a relatively large number of rays will be tested for intersection with the same region in the scene at the same time; whereas if the rays to be tested for intersection are relatively incoherent then a relatively small number of rays will be tested for intersection with the same region in the scene at the same time. Rays are "coherent" if they are submitted for intersection testing at temporally close times and have similar origins and similar directions. If the rays are relatively coherent, the number of rays to be tested for intersection with a particular region in the scene at a particular time tends to be larger than if the rays are relatively incoherent. As such, when the rays are relatively incoherent, the limiting factor is more likely to be the memory bandwidth, i.e. the rate at which data representing different regions in the scene can be fetched from memory, and this means that some of the testing blocks of the intersection testing module may be idle in any given processing cycle. In contrast, when the rays are relatively coherent, the limiting factor is more likely to be the throughput of the intersection testing module, and in this case fewer of the testing blocks tend to be idle in any given processing cycle.

In examples described herein, the intersection testing module can dynamically decide whether to test or to skip testing of a particular node during intersection testing based on the conditions in the ray tracing system. If the intersection testing module decides to skip testing of a particular node then it may instead test the children of the particular node. In this way, the intersection testing module can dynamically change the topology of the hierarchical acceleration structure being traversed. This can increase the performance of the ray tracing system. For example, if many of the testing blocks of the intersection testing module would be idle in a particular processing cycle if the particular node was tested for intersection, then the testing of the particular node can be skipped and instead the children of the particular node can be tested for intersection in the particular processing cycle. In this way, the intersection testing module can advance a level in the hierarchical acceleration structure with little cost, e.g. for free (i.e. without incurring any extra latency) in examples in which multiple levels of the acceleration structure are encoded together. Skipping the intersection testing in respect of the particular node may be considered to be skipping intersection testing for a level in a sub-tree which includes the particular node within the hierarchical acceleration structure. Skipping intersection testing for a level in a sub-tree within a hierarchical acceleration structure can be referred to as "flattening" the sub-tree.

In some examples, the particular node is an implicitly represented node. In these examples, the intersection testing module can dynamically decide whether to generate the particular node (i.e. infer data defining the region represented by the particular node) during intersection testing based on the conditions in the ray tracing system. Therefore, the intersection testing module can dynamically decide whether to generate and test implicitly represented nodes during intersection testing or whether to just test the children of the implicitly represented nodes based on current system conditions, e.g. based on what is the current bottleneck in the system (e.g. based on a determination as to whether some of the testing blocks of the intersection testing module would be idle if the implicitly represented node was generated and tested for intersection). The term "dynamically" is used here to mean during an intersection testing phase of rendering an image of the scene (e.g. rather than during an acceleration structure generating phase of rendering the image of the scene).

Figure 2A:
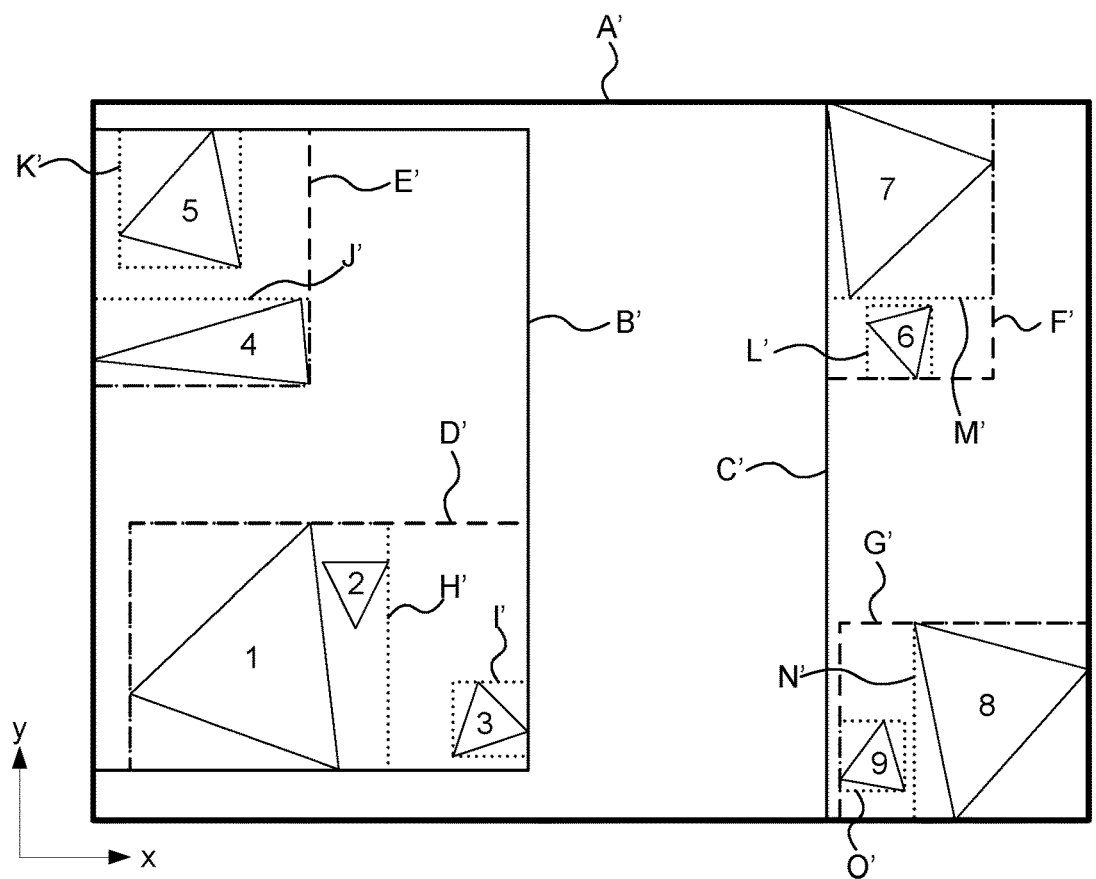
FIG. 2a shows a 2D example of regions and primitives within a scene against which rays are to be tested for intersection.
Figure 2B:
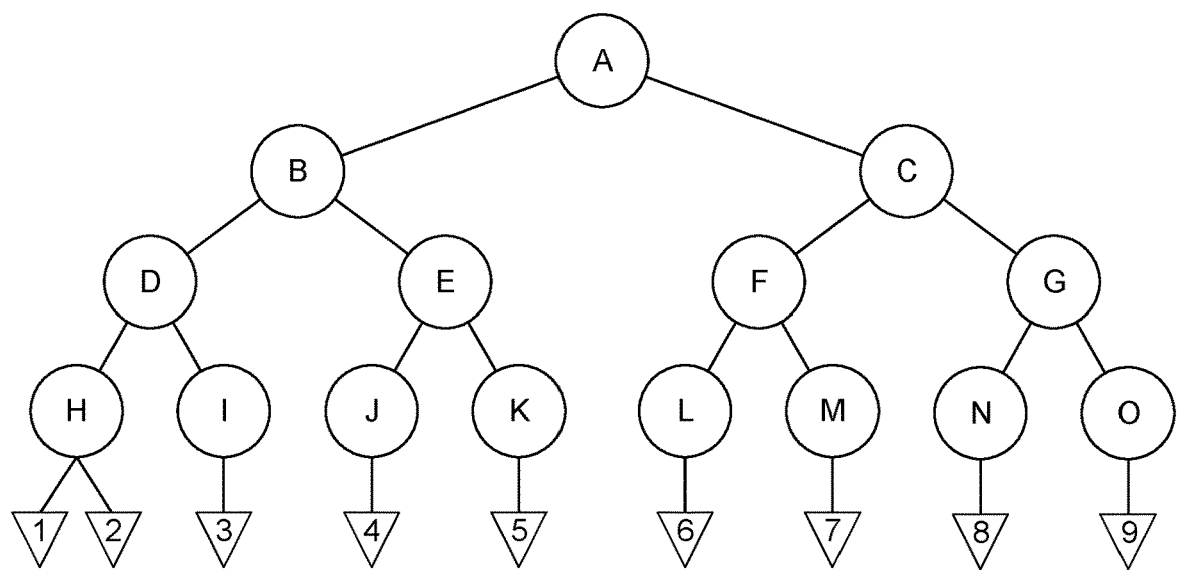

FIG. 2a shows a 2D example of regions and primitives within a scene against which rays are to be tested for intersection. In other examples, the scene and the regions are three-dimensional, but for ease of illustration and understanding FIG. 2a shows a two-dimensional scene with two-dimensional regions within the scene. FIG. 2b illustrates a hierarchical acceleration structure used to represent the regions shown in FIG. 2a. FIG. 2a shows the directions of the x and y axes. All of the regions shown in FIG. 2a are axis-aligned bounding boxes (AABBs). FIG. 2a also illustrates nine triangular primitives (labelled 1 to 9 in FIG. 2a) within the scene. Primitives are used to represent objects in the scene to be rendered, and can be any shape, but often primitives are planar polygons (e.g. triangles), lines or points, which can be defined in terms of their vertices.

The root node (A) of the hierarchical acceleration structure represents the region A' which is an AABB covering the whole scene. Node A has two children in the hierarchical acceleration structure: nodes B and C. Node B represents the region B' which is an AABB shown towards the left hand side of the scene shown in FIG. 2a. Node C represents the region C' which is an AABB shown towards the right hand side of the scene shown in FIG. 2a. Node B has two children in the hierarchical acceleration structure: nodes D and E. Node D represents the region D' which is an AABB represented with a dashed line towards the bottom of the region B' shown in FIG. 2a. Node E represents the region E' which is an AABB represented with a dashed line towards the top left of the region B' shown in FIG. 2a. Node D has two children in the hierarchical acceleration structure: nodes H and I. Node H represents the region H' which is an AABB represented with a dotted line towards the left hand side of the region D', and which contains the primitives 1 and 2 as shown in FIG. 2a. Node I represents the region I' which is an AABB represented with a dotted line towards the bottom right of the region D', and which contains the primitive 3 as shown in FIG. 2a. Node E has two children in the hierarchical acceleration structure: nodes J and K. Node J represents the region J' which is an AABB represented with a dotted line at the bottom of the region E', and which contains the primitive 4 as shown in FIG. 2a. Node K represents the region K' which is an AABB represented with a dotted line towards the top of the region E', and which contains the primitive 5 as shown in FIG. 2a. Node C has two children in the hierarchical acceleration structure: nodes F and G. Node F represents the region F' which is an AABB represented with a dashed line at the top left of the region C' shown in FIG. 2a. Node G represents the region G' which is an AABB represented with a dashed line at the bottom of the region C' shown in FIG. 2a. Node F has two children in the hierarchical acceleration structure: nodes L and M. Node L represents the region L' which is an AABB represented with a dotted line at the bottom of the region F', and which contains the primitive 6 as shown in FIG. 2a. Node M represents the region M' which is an AABB represented with a dotted line at the top of the region F', and which contains the primitive 7 as shown in FIG. 2a. Node G has two children in the hierarchical acceleration structure: nodes N and O. Node N represents the region N' which is an AABB represented with a dotted line on the right of the region G', and which contains the primitive 8 as shown in FIG. 2a. Node O represents the region O' which is an AABB represented with a dotted line towards the bottom left of the region G', and which contains the primitive 9 as shown in FIG. 2a.

The primitives shown in FIG. 2b are not actually part of the hierarchical acceleration structure, but they are shown to illustrate how the primitives relate to the nodes of the hierarchical acceleration structure. A "node" of the hierarchical acceleration structure represents a region (e.g. an AABB). A "tree node" refers to a node which has pointers to other nodes in the hierarchical acceleration structure (i.e. a tree node has child nodes in the hierarchical acceleration structure). A "leaf node" refers to a node which has one or more pointers to one or more primitives (i.e. a leaf node does not have child nodes in the hierarchical acceleration structure). With reference to FIG. 2b, nodes A, B, C, D, E, F and G are tree nodes of the hierarchical acceleration structure; nodes H, I, J, K, L M, N and O are leaf nodes of the hierarchical acceleration structure; and triangles 1 to 9 are not nodes of the hierarchical acceleration structure, but are illustrated in FIG. 2b to indicate which leaf nodes have pointers to which primitives.

Figure 3:
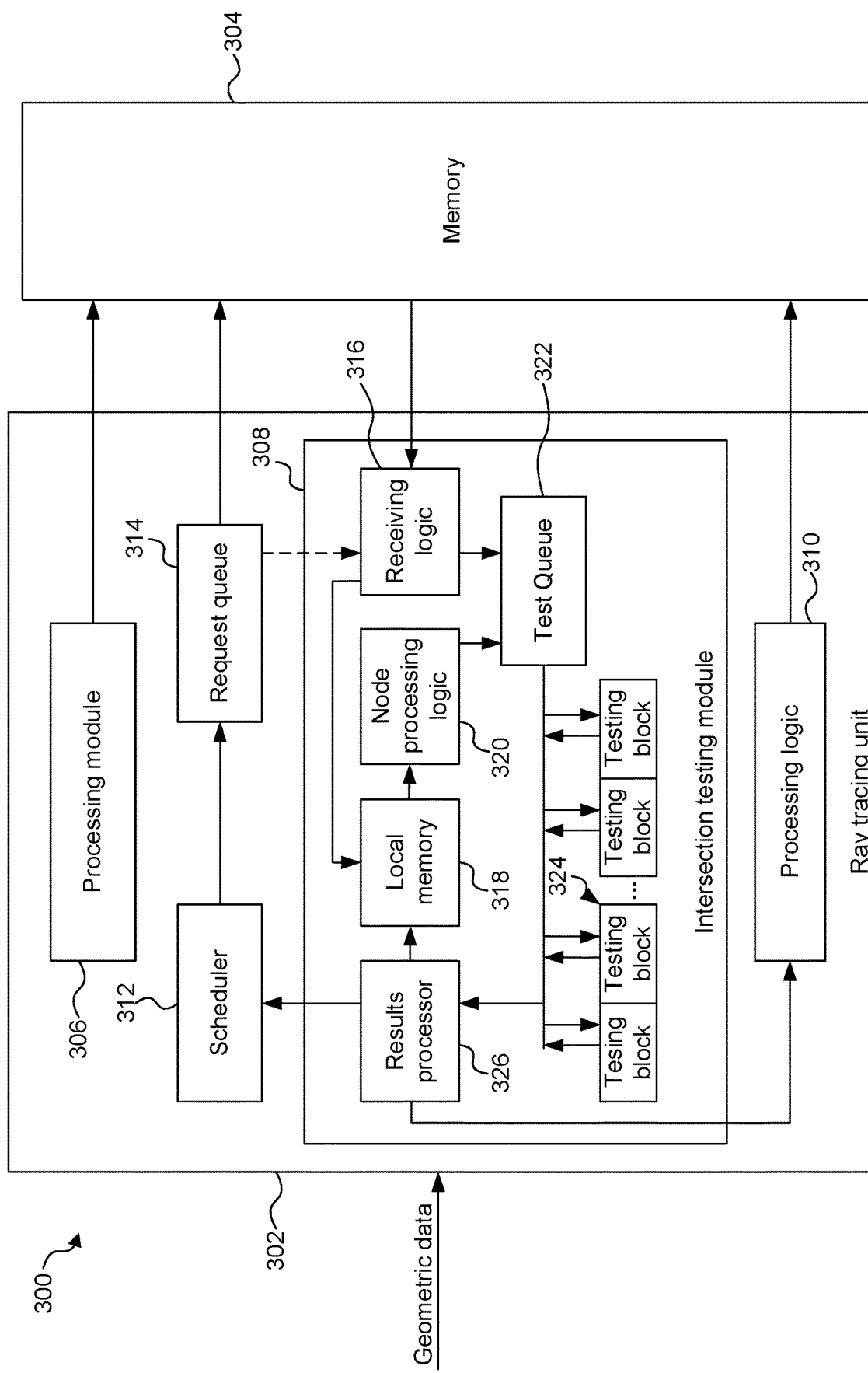
FIG. 3 shows a ray tracing system according to examples described herein.

FIG. 3 shows a ray tracing system 300 according to examples described herein. Ray tracing system 300 comprises a ray tracing unit 302 and a memory 304. The ray tracing unit 302 comprises a processing module 306, an intersection testing module 308, processing logic 310, a scheduler 312 and a request queue 314. The intersection testing module 308 comprises receiving logic 316, a local memory 318, node processing logic 320, a test queue 322, a set (or "array") of one or more testing blocks (denoted generally at 324) and a results processor 326. The request queue 314 and the test queue 322 may take the form of buffers, e.g. stacks (i.e. first-in-last-out (FILO) buffers) or first-in-first-out (FIFO) buffers. The testing blocks 324 may be implemented as hardware units (e.g. using fixed-function circuitry) or in software, for example as shader code executed by a processing unit.

In operation the ray tracing unit 302 receives geometric data defining objects within the scene. For example, the scene may be a 3D scene or a 2D scene. The ray tracing unit 302 also receives an indication of a viewpoint from which an image of the scene is to be rendered. The processing module 306 is configured to generate an acceleration structure based on the geometric data, and to send data representing the acceleration structure to the memory 304 for storage therein. The processing module 306 could be implemented in hardware (e.g. fixed-function circuitry) or in software (e.g. as computer code executed on a general purpose processing unit).

Figure 4:
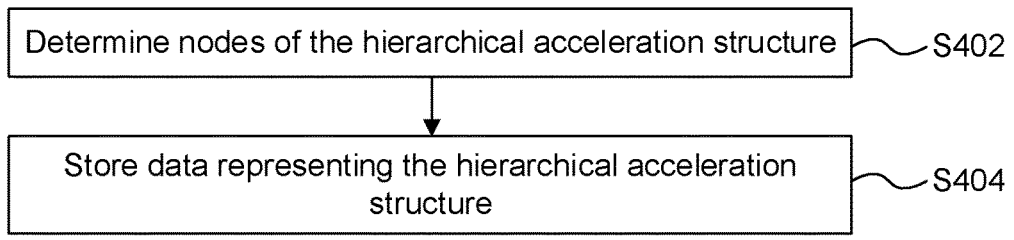
FIG. 4 is a flow chart for a method of generating a hierarchical acceleration structure to be used for intersection testing in a ray tracing system.

FIG. 4 shows a flow chart for a method of generating a hierarchical acceleration structure to be used for intersection testing in the ray tracing system 300. In step S402, the processing module 306 determines nodes of the hierarchical acceleration structure. As described above, each of the nodes represents a region in the scene, and the nodes are linked to form the hierarchical acceleration structure. The nodes are determined based on the geometric data received at the ray tracing unit 302 that defines the objects within the scene. A person skilled in the art would be aware that there are many methods for determining nodes of a hierarchical acceleration structure based on geometric data defining objects within the scene. The details of these methods are beyond the scope of this disclosure. Furthermore, the structure of the hierarchical acceleration structure can be different in different examples. For example, a hierarchical acceleration structure could be a Bounding Volume Hierarchy (BVH), in which the nodes represent regions in the scene which tightly bound objects or primitives in the scene. The regions represented by nodes of a hierarchical acceleration structure with a BVH structure might not have regular sizes and might not be contiguous. For example, the regions represented by the nodes at a particular level in a hierarchical acceleration structure with a BVH structure might not all have the same size or shape and collectively might not cover all of the scene. The hierarchical acceleration structure shown in FIGS. 2a and 2b has a BVH structure. For example, it can be seen that the regions D', E', F' and G' represented by the nodes at one level in the hierarchy do not all have the same size or shape and do not collectively cover all of the scene. In contrast, a hierarchical acceleration structure could have a spatial subdivision structure, such as a multi-level grid structure or an octree structure, in which the nodes represent regions which are regular subdivisions of the scene. The regions represented by nodes of a hierarchical acceleration structure with a spatial subdivision structure have regular sizes and are contiguous. For example, the regions represented by the nodes at a particular level in a hierarchical acceleration structure with a spatial subdivision structure all have the same size and shape and collectively represent all of the scene.

In step S404 data representing the hierarchical acceleration structure is stored. In particular, the processing module 306 causes the data representing the hierarchical acceleration structure to be stored in the memory 304 by sending the data to the memory 304. The stored data (i.e. the data representing the hierarchical acceleration structure) comprises data defining the regions represented by a plurality of the nodes of the hierarchical acceleration structure. However, in examples described herein, at least one node of the hierarchical acceleration structure is an implicitly represented node, wherein data defining a region represented by an implicitly represented node is not explicitly included as part of the stored data but can be inferred from the stored data. An implicitly represented node may be referred to herein as an "implied node".

The data defining a region represented by an implicitly represented node can be inferred from the stored data using at least some of the data (which is explicitly stored) defining the regions represented by at least some of the other nodes of the hierarchical acceleration structure. For example, the "at least some of the other nodes" may be the descendants of the implicitly represented node at a particular level in the hierarchical acceleration structure, e.g. the children or the grandchildren of the implicitly represented node.

The stored data representing the hierarchical acceleration structure may comprise data indicating how the nodes of the hierarchical acceleration structure are linked. At least some of the data indicating how the nodes of the hierarchical acceleration structure are linked can be used to infer the data defining a region represented by an implicitly represented node, e.g. by identifying which of the nodes in the hierarchical acceleration structure are the descendants of the implicitly represented node at a particular level in the hierarchical acceleration structure (e.g. by identifying which nodes are the children or the grandchildren of the implicitly represented node).

As described above, in examples described herein, the regions represented by the nodes of the hierarchical acceleration structure are axis-aligned bounding boxes (AABBs) in the scene, e.g. as shown in the 2D example of FIG. 2a. An AABB can be defined by specifying, for each axis, a minimum and a maximum component along that axis. The data defining a region represented by an implicitly represented node can be inferred by determining, in each dimension of the scene, a minimum and a maximum component of the components defining the axis-aligned bounding boxes represented by the descendants of the implicitly represented node at a particular level in the hierarchical acceleration structure (e.g. represented by the children or the grandchildren of the implicitly represented node in the hierarchical acceleration structure).

Figure 5:
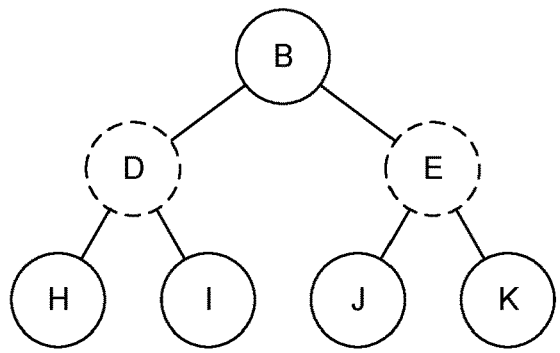
FIG. 5 shows part of a hierarchical acceleration structure in which two of the nodes are implicitly represented.

For example, FIG. 5 shows part of the hierarchical acceleration structure shown in FIG. 2b, in a situation in which two of the nodes (nodes D and E) are implicitly represented. The implicitly represented nodes are shown with dashed lines in FIG. 5. Data representing the hierarchical acceleration structure shown in FIG. 5 can be stored. Data defining the nodes D and E is not explicitly included as part of the data representing the hierarchical acceleration structure, but data defining the child nodes H, I, J and K is explicitly included as part of the stored data, and can be used to infer the regions represented by the nodes D and E.

Since data defining the region represented by an implicitly represented node is not explicitly included as part of the stored data, the amount of data that is used to represent the hierarchical acceleration structure is reduced, compared to if none of the nodes of the hierarchical acceleration structure were implicitly represented.

Figure 6:
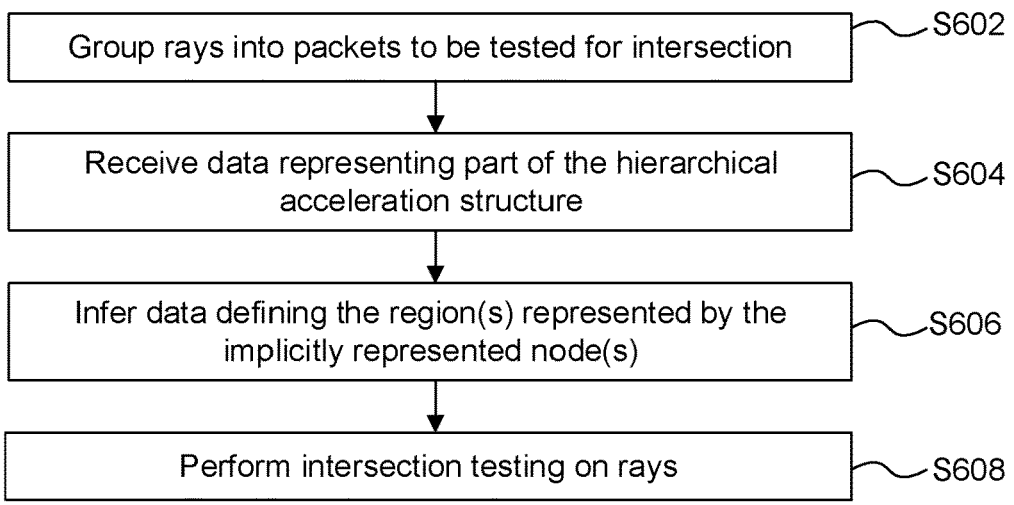
FIG. 6 is a flow chart for a first method of performing intersection testing in a ray tracing system.

FIG. 6 is a flow chart for a first method of performing intersection testing in the ray tracing system 300. The scheduler 312 receives instructions to trace (i.e. to perform intersection testing for) a set of one or more rays. These instructions may be received from a shader core in a GPU (e.g. from the processing logic 310 of the ray tracing unit 302) or from a CPU. For example, a shader program executing on a shader core (e.g. executing on the processing logic 310) may create rays and send them to the scheduler 312 for them to be traversed against the acceleration structure, i.e. for intersection testing to be performed on them using the acceleration structure. In step S602, the scheduler groups rays into packets to be tested for intersection. The scheduler 312 may do this to group rays which require access to the same block or portion of the memory 304. For example, the scheduler 312 may group rays into packets to be tested for intersection with regions represented by nodes of the hierarchical acceleration structure for which data is received in a data block. The block or portion of the memory 304 may be a contiguous block of memory at a set of memory addresses which can be fetched from the memory 304 together. A group of rays that reference the same block of the memory 304 may be referred to as a packet. For example, rays which are to be tested with respect to the same box or object may be grouped into a packet, such that the data for the box or object can be fetched once from the memory 304 for use in the intersection testing of all of the rays in the packet. As an example, for the initial stage of the intersection testing, it may be the case that all rays will intersect the root node (e.g. node A in FIG. 2b) and thus require access to the same block of memory 304 and so fall within one packet. Once the scheduler 312 has assembled one or more rays into a packet, the scheduler 312 will issue the packet and cause the packet to join the request queue 314 to request the node data for the packet (i.e. to request data describing a box corresponding to the appropriate node of the acceleration structure against which the rays of the packet are to be tested for intersection) from memory 304.

In step S604 the node data for the packet is then retrieved from memory 304 and passed to the intersection testing module 308. That is, in step S604, the receiving logic 316 of the intersection testing module 308 receives data representing at least part of a hierarchical acceleration structure. For example, the received data may represent the part of a hierarchical acceleration structure shown in FIG. 5. The received data comprises data defining the regions represented by a plurality of the nodes of the hierarchical acceleration structure (e.g. nodes B, H, I, J and K). However, data defining regions represented by implicitly represented nodes (e.g. nodes D and E) is not explicitly included as part of said received data. This data can be inferred from the received data.

The receiving logic 316 passes the node data (i.e. the data defining the part of the hierarchical acceleration structure) that it has received from the memory 304 to the local memory 318 for storage therein. The local memory 318 temporarily stores data for the nodes when that data has been fetched from the memory 304 so this data can be reused, e.g. for performing intersection tests for rays with the nodes defined by the node data, without re-fetching the node data from the memory 304. The node data is provided from the local memory 318 to the node processing logic 320.

In step S606 the node processing logic 320 infers, from the received data, data defining the region(s) represented by the implicitly represented node(s). For example, the node processing logic 320 can infer the data defining the region represented by the implicitly represented node D using the data defining the regions represented by the nodes H and I, and the node processing logic 320 can infer the data defining the region represented by the implicitly represented node E using the data defining the regions represented by the nodes J and K. For example, it can be seen with reference to FIGS. 2a, 2b and 5 that the minimum and maximum components in each of the x and y dimensions of the AABB represented by node D can be inferred by determining the minimum and maximum of the components of the nodes H and I (which are the children of node D). Similarly, the minimum and maximum components in each of the x and y dimensions of the AABB represented by node E can be inferred by determining the minimum and maximum of the components of the nodes J and K (which are the children of node E). Therefore, in this example, step S606 involves inferring the data defining the region represented by each of the implicitly represented nodes by determining the minimum and maximum of the components, in each dimension, of the regions represented by the children of the implicitly represented node. The node data for a node (either as explicitly defined in the data retrieved from the memory 304, or as inferred in step S606) is passed to the test queue 322. In this example, the regions represented by the nodes are AABBs, but in other examples the regions could be other shapes, e.g. spheres or polyhedrons. In these other examples, a skilled person would know how to infer a region represented by an implicitly represented node using data defining other regions represented by other nodes in the hierarchical acceleration structure.

The receiving logic 316 also receives an indication of one or more rays to be tested for intersection with a region represented by one of the nodes of the part of the hierarchical acceleration structure. For example, the ray data for a packet of rays is received at the receiving logic 316 from a memory (e.g. memory 304) or from the request queue 314 (via the link, shown with a dashed line in FIG. 3), to be associated with the corresponding node data at test queue 322.

When ray data for a packet of rays and node data for a node to be tested for intersection with the rays of the packet has been received at the test queue 322, the intersection testing module 308 allocates rays from the packet to the testing blocks 324. The intersection testing module 308 might allocate the rays to the testing blocks 324 sequentially. When a ray of the packet has been allocated to a testing block, that testing block performs intersection testing to determine whether that ray intersects the region corresponding to the node that ray is being tested against, e.g. by performing edge tests for the appropriate edges of the box. In this way, in step S608, the testing blocks 324 perform intersection testing on rays in the scene by testing the rays for intersection with regions represented by nodes of the hierarchical acceleration structure. When the rays are being tested for intersection with an implicitly represented node, then step S608 comprises using the data inferred in step S606 to test the rays for intersection with the region represented by the implicitly represented node of the hierarchical acceleration structure. Methods of implementing an intersection test to determine whether a ray intersects a region (e.g. an AABB) are known in the art, and for conciseness are not described in detail herein.

The testing blocks 324 each output the result of the intersection tests they have performed to the results processor 326. The results processor 326 processes the results of the intersection tests. Specifically, if a ray has been found to not intersect the node it was being tested against, the results processor 326 does not schedule intersection tests for that ray in respect of the child nodes of the node which was not intersected. If the results processor 326 determines that a ray has intersected a node it was being tested against, that ray is output from the intersection testing module 308 back to the scheduler 312, where it will be grouped into a packet and scheduled for intersection testing in respect of a child node of the intersected node.

The process described above with reference to steps S602 to S608 is repeated iteratively until the rays have no more hits. In response to an intersection of a ray with a leaf node (e.g. one of leaf nodes H, I, J, K, L, M, N or O shown in FIG. 2b), the object(s) within that leaf node are each scheduled for intersection testing with the ray. The intersection testing module 308 may comprise object testing blocks (not shown in FIG. 3) configured to perform intersection tests for the rays that intersect a leaf node in respect of the object(s) within that leaf node. The objects may be described with triangular primitives, such that the object testing blocks are configured to test rays for intersection with respect to triangles in the scene. A person skilled in the art would know how to test a ray for intersection with a triangular primitive, and the details of this process are not described in detail herein. If the result of all the intersection testing for a ray is that the ray does not intersect with any objects in the scene then a 'miss' result is returned and can be processed accordingly. If the result of all the intersection testing for a ray is that the ray intersects with a single object then data for this intersection can be returned with a 'hit' result and processed accordingly. If the result of all the intersection testing for a ray is that the ray intersects with more than one object then the intersection distances for the intersections (i.e. the distances from the ray origin to the intersection points) are compared to find the 'closest hit', i.e. the intersection point closest to the ray origin. Data for this closest hit intersection can be returned with a 'hit result' and processed accordingly. When a 'hit' result is determined, data relating to the intersection can be determined by the object testing blocks, e.g. an indication of the position of the intersection on the intersected primitive (e.g. as barycentric co-ordinates) and an indication of a distance of the intersection from the ray origin.

The results of the intersection testing (e.g. the hit results) are passed to the processing logic 310. The processing logic 310 executes one or more shader programs to process results of the intersection testing to determine rendered values representing the image of the scene. In this way, the effects of the intersections can be determined, i.e. the intersection testing results are used for determining rendered values representing the image of the scene.

In order to render an image of a 3D scene, many intersection tests (e.g. millions or even billions of intersection tests) may be performed. Therefore, it is important for the performance of the ray tracing system 300 that the intersection testing module 308 can perform intersection tests quickly. This means that it can be beneficial to implement the intersection testing module 308 in hardware (e.g. using fixed function circuitry) so that the latency of the intersection testing operations is relatively low compared to performing the intersection tests in software. However, in some systems, the intersection testing module 308 may be implemented in software executed on a general purpose processing unit. In general, the processing logic 310 could be implemented in hardware or software, but it is often beneficial to allow flexibility in the functionality performed by the processing logic 310 to process the results of the intersection testing, so often the processing logic 310 is configured to execute shader programs, i.e. modules of computer code, to process the results of the intersection testing. The processing logic 310 may be implemented as a Single Instruction Multiple Data (SIMD) processing unit configured to execute an instruction on multiple data items in parallel. The rendered values determined by the processing logic 310 can be passed back to the memory 304 for storage therein to represent the image of the 3D scene.

Figure 7A:
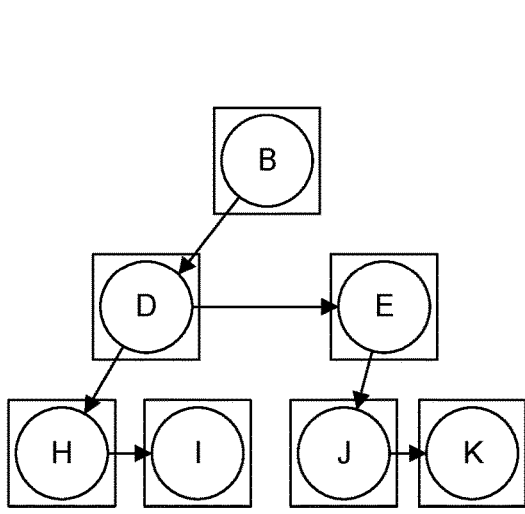
FIG. 7a illustrates a first example of storing nodes of a hierarchical acceleration structure in data blocks.
Figure 7B:
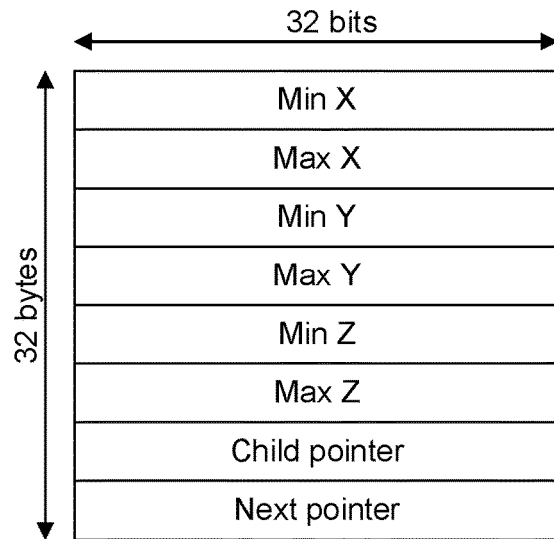

The format of the data that is stored to represent the hierarchical acceleration structure can be different in different examples. For example, the data representing the hierarchical acceleration structure comprises two elements: (i) information defining the regions (e.g. AABBs) represented by the nodes of the hierarchical acceleration structure, and (ii) information about the topology of the hierarchy, e.g. information defining how the nodes are linked to form the hierarchical acceleration structure. FIGS. 7a and 7b show a simple example in which the data for each node of a hierarchical acceleration structure is stored in a separate data block. FIG. 7a shows the nodes of part of a hierarchical acceleration structure as circles and the squares represent data blocks. The arrows show links (either sibling links or child links) between nodes in the hierarchical acceleration structure. In this example, the regions represented by the nodes are AABBs. FIG. 7b shows the format of data in a data block in this example. As shown in FIG. 7b, a data block comprises data defining the AABB represented by a node, as maximum and minimum component values in each of the X, Y and Z dimensions. The data block also comprises a "child pointer" to indicate a child node and a "next pointer" to indicate a sibling node. It is noted that in this example, each node does not have more than one parent node in the hierarchical acceleration structure. Even if a node has multiple children in the hierarchical acceleration structure, only one child pointer is used in the data block for the node in this example, and the "next pointers" indicate the siblings of the nodes. The next pointers may be referred to as sibling pointers. For example, in the part of the hierarchical acceleration structure shown in FIG. 7a, nodes D and E are siblings and nodes H and I are the children of node D. In the data block for node D, the child pointer points to node H and the next pointer points to node E. The next pointer for node H points to node I.

In this way, multiple child nodes form a linked list using the sibling pointers. When the intersection testing for a particular node returns a hit result, each child node of the particular node is fetched in turn by following the appropriate pointers and then intersection testing is individually performed for each of the child nodes. The example shown in FIG. 7a is a binary tree (i.e. each tree node has exactly two children), but the same data structure shown in FIG. 7b can be used with hierarchical acceleration structures that have larger branching factors (i.e. where nodes can have more than two children in the hierarchical acceleration structure). This is achieved by linking more than two siblings together using the sibling pointers.

In the example shown in FIG. 7b, each field of the data block comprises 32 bits and there are 8 fields, so the data block has 32 bytes of data representing a single node in the hierarchy. Individually storing nodes in separate data blocks tends to be inefficient for memory reads from the memory 304, which may for example be implemented as Dynamic Random Access Memory (DRAM). The memory 304 has a minimum burst size, which is the smallest amount of data that can be read from the memory in a single read operation. In examples described herein, the minimum burst size of the memory 304 is 64 bytes, but in other examples, the minimum burst size could be greater than, or less than, 64 bytes. The data for a single node in the hierarchical acceleration structure tends to be less than 64 bytes (e.g. it is 32 bytes in the example shown in FIG. 7*b*), i.e. less than the minimum burst size of the memory 304. Therefore, having the data for a single node in each data block wastes memory bandwidth.

Figure 8A:
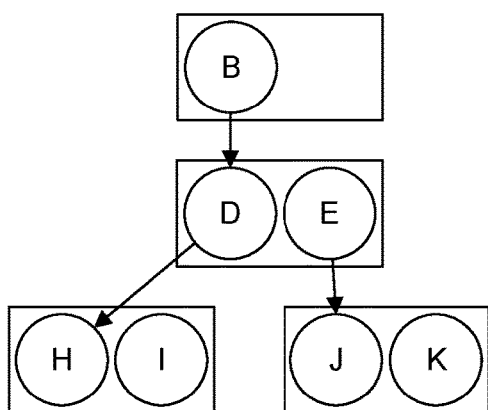
FIG. 8a illustrates a second example of storing nodes of a hierarchical acceleration structure in data blocks.
Figure 8B:
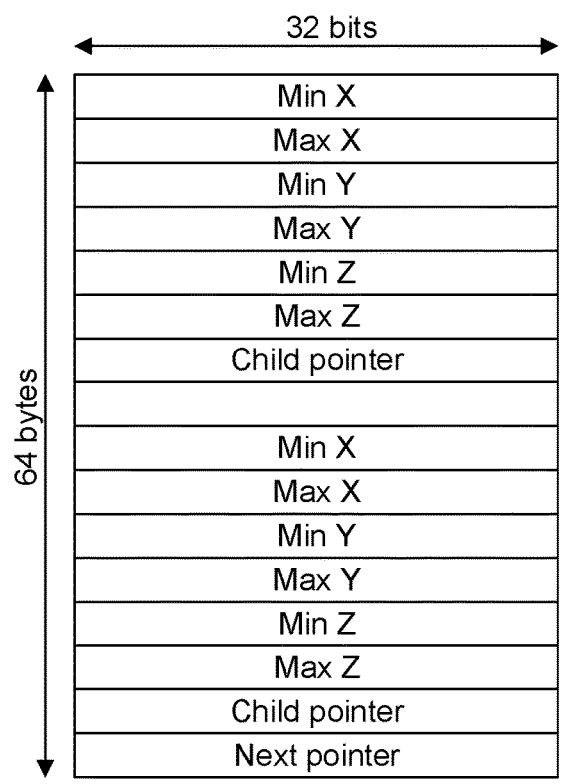

To improve upon the basic scheme shown in FIGS. 7*a* and 7*b*, multiple sibling nodes can be stored in one contiguous block of memory (i.e. in one data block). When the intersection testing for a node returns a hit result, all of the children of the node are fetched for intersection testing, so it can be beneficial to combine them into one read if possible. For example, FIG. 8*a* illustrates a second example of storing nodes of a hierarchical acceleration structure in data blocks. Again, the nodes of part of a hierarchical acceleration structure are shown as circles and the squares represent data blocks. The arrows show child links between nodes in the hierarchical acceleration structure. In this example each data block comprises data for up to two nodes. In this example, if multiple nodes are included in a data block then they are sibling nodes. As such, sibling links between nodes in a data block do not need to be stored. FIG. 8*b* shows the format of data in a data block in the example shown in FIG. 8*a*.

As shown in FIG. 8*b*, a data block now has 64 bytes of data and includes data representing two nodes of the hierarchical acceleration structure (as opposed to the example shown in FIG. 7*b* in which a data block has 32 bytes of data and includes data representing one node). Since, in this example, the minimum burst size of the memory 304 is 64 bytes, it is more efficient in terms of memory bandwidth to use the format shown in FIG. 8*b* rather than the format shown in FIG. 7*b*.

Figure 9A:
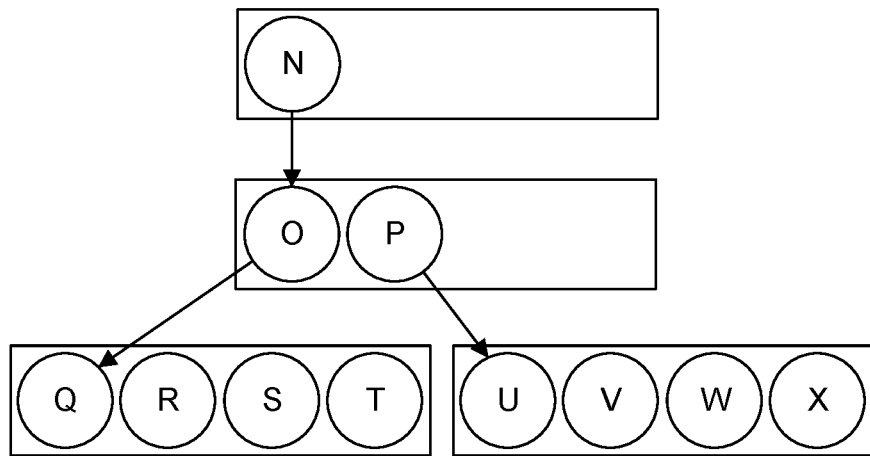
FIG. 9a illustrates a third example of storing nodes of a hierarchical acceleration structure in data blocks.
Figure 9B:
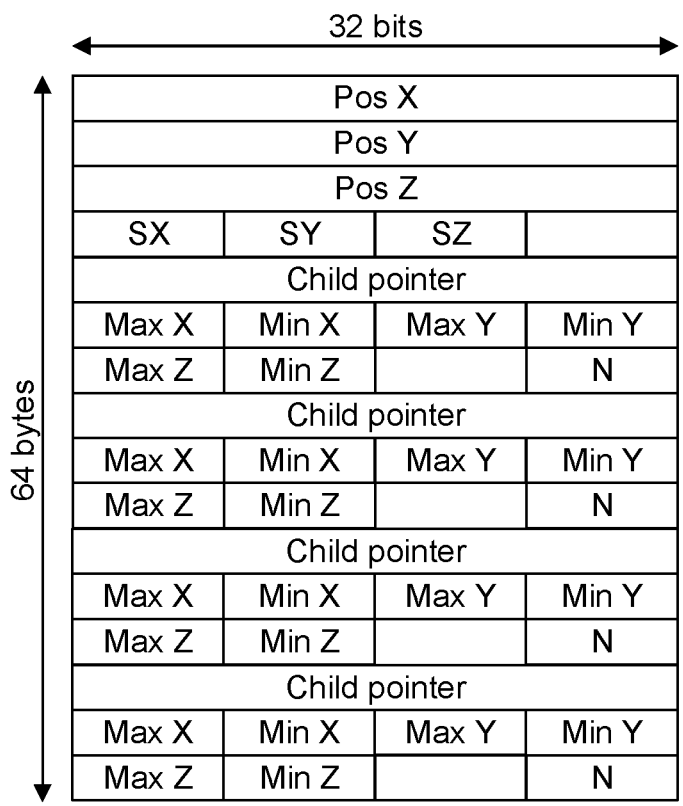

Compression techniques can be used to represent more than two sibling nodes in a data block without increasing the size of the data block. For example, FIG. 9*a* illustrates a third example of storing nodes of a hierarchical acceleration structure in data blocks. Again, the nodes of part of a hierarchical acceleration structure are shown as circles and the squares represent data blocks. The arrows show child links between nodes in the hierarchical acceleration structure. In this example each data block comprises data for up to four nodes. In this example, if multiple nodes are included in a data block then they are sibling nodes. As such, sibling links between nodes in a data block do not need to be stored. FIG. 9*b* shows the format of data in a data block in the example shown in FIG. 9*a*.

In this example, the nodes that are stored within a data block are sibling nodes. This means that all of the nodes that are stored within a data block have the same parent node. For example, as shown in FIG. 9*a*, nodes O and P are sibling nodes and are both children of node N; nodes Q, R, S and T are sibling nodes and are all children of node O; and nodes U, V, W and X are sibling nodes and are all children of node P. As can be seen from the example shown in FIGS. 2*a* and 2*b*, nodes which have the same parent are local in space, i.e. they normally represent regions which are close to each other in the scene. The proximity of the nodes within a data block can be used to compress the data defining the regions represented by the nodes within a data block. For example, the bounds of the AABBs represented by the nodes can be stored as offsets from a shared base value. For example, as shown in FIG. 9*b*, X, Y and Z position components ("Pos X", "Pos Y" and "Pos Z") are stored to indicate a position (e.g. a central position) of a common origin region (e.g. the parent AABB). The "SX", "SY" and "SZ" fields represent the size of the common origin region. The data stored in the Pos X, Pos Y, Pos Z, SX, SY and SZ fields indicates an approximate size and position of the AABB represented by the parent of the four nodes for which data is stored in the data block. For example, a data block having the format shown in FIG. 9*b* may store data for nodes Q, R, S and T, and the data stored in the Pos X, Pos Y, Pos Z, SX, SY and SZ fields indicates an approximate size and position of the region represented by node O.

For each of the four nodes for which data is stored in the data block having the format shown in FIG. 9*b* (e.g. for each of nodes Q, R, S and T), the data block stores a child pointer, and minimum and maximum component offsets in each of the X, Y and Z dimensions (denoted "Max X", "Min X", "Max Y", "Min Y", "Max Z" and "Min Z") and an indication of how many children the node has in the hierarchical acceleration structure (denoted "N"). In the format shown in FIG. 9*b*, the "Pos X", "Pos Y", "Pos Z" fields and the Child pointer fields have 32 bits; and the "SX", "SY", "SZ", "Max X", "Min X", "Max Y", "Min Y", "Max Z", "Min Z" and "N" fields have 8 bits. The values of the "Max X", "Min X", "Max Y", "Min Y", "Max Z" and "Min Z" fields are chosen so that the size of the box is not reduced by representing these values with just 8 bits (rather than with 32 bits). In particular, the min values are encoded to be less than or equal to the true (32-bit) minimum values (e.g. by using a round to negative infinity rounding mode when reducing the number of bits used to represent the minimum values) and the maximum values are encoded to be greater than or equal to the true (32-bit) maximum values (e.g. by using a round to positive infinity rounding mode when reducing the number of bits used to represent the maximum values). The data block has a total size of 64 bytes, which matches the minimum burst size of the memory 304.

As described above, the SX, SY and SZ values represent the size of the shared box (i.e. the common origin region) that each of the AABBs is contained within for the four nodes for which data is stored in the data block (e.g. for nodes Q, R, S and T). In this example, the SX, SY and SZ values are stored as floating point exponents, so the common origin region is restricted to power-of-two sizes. The position of the shared box (or "common origin region") is indicated by the data in the Pos X, Pos Y and Pos Z fields. For example, the centre of the shared box may be located at the position indicated by the data in the Pos X, Pos Y and Pos Z fields. The 8-bit offset values ("Max X", "Min X", "Max Y", "Min Y", "Max Z", "Min Z") for a particular one of the four nodes for which data is stored in the data block define, relative to the bounds of the shared box, the minimum and maximum components of the AABB represented by the particular node.

As well as compressing the data defining the bounds of the regions represented by the nodes, sibling pointers are not included in the data block shown in FIG. 9*b*. Instead, an indication "N" is included which indicates the number of children that the node has in the hierarchical acceleration structure. The indication of a number of children can be an indication of a number of child data blocks. In this case, if the number of children that a node has is in the range 1-4 then "1" would be stored in the "N" field, if the number of children that a node has is in the range 5-8 then "2" would be stored in the "N" field, and so on. Multiple data blocks for a child list may be stored consecutively in memory to avoid the need for horizontal pointers, i.e. to avoid the need for sibling pointers.

In the example shown in FIGS. 9a and 9b, nodes in a data block must have the same parent; cousin nodes cannot be packed together. Because of this, the format shown in FIGS. 9a and 9b is particularly beneficial when the hierarchical acceleration structure contains nodes with a large branching factor (e.g. a branching factor of at least 4). The branching factor of a node is the number of children that the node has. The branching factor is not necessarily the same for every node of the hierarchical acceleration structure. In the example shown in FIG. 9a, nodes O and P each have four children to increase utilisation of the data blocks having the format shown in FIG. 9b. However, the inventors of this application have determined that lower branching factors (e.g. a branching factor of 2) tend to be better for minimising the number of intersection tests that are performed by the intersection testing module 308. This is because the more boxes there are, the more likely a ray is to hit more of them because they "overlap" from the perspective of the ray. However, being able to pack more nodes together into a data block is better for memory bandwidth. Therefore, when determining a suitable branching factor, there is a trade-off to be made between reducing the number of intersection tests and reducing memory bandwidth.

Even with the format shown in FIG. 9b, the memory bandwidth (i.e. the amount of data passing between the ray tracing unit 302 and the memory 304) can sometimes be a problem, e.g. it can still be the limiting factor in terms of the speed at which intersection testing can be performed. To address this problem, the format of the data blocks could be modified so that data for nodes from multiple levels of the hierarchical acceleration structure is included in a single data block. For example, a data block may comprise data representing a sub-tree within the hierarchical acceleration structure, wherein the sub-tree comprises one or more nodes at a plurality of levels within the hierarchical acceleration structure. In some examples, a data block may comprise data representing multiple sub-trees within a hierarchical acceleration structure. A data block, encoding a sub-tree, can be cached locally near the testing blocks 324 while they traverse the sub tree. For example, a data block encoding a sub-tree can be stored in the local memory 318 while intersection testing is performed on nodes of the sub-tree. Since nodes from multiple levels of the hierarchical acceleration structure can be retrieved in a single data block, the memory bandwidth between the ray tracing unit 302 and the memory 304 can be reduced. For example, when the intersection testing module 308 determines that a ray intersects a particular node, the data for the children of the particular node might already be in the local memory 318 and therefore does not need to be fetched from the memory 304.

The local memory 318 stores a data block while the testing blocks 324 sequentially test the nodes in the multiple levels of the sub-tree represented by the data in the data block. The local memory 318 is small and has low latency, so it is easier to achieve a high throughput when fetching node data from the local memory 318 compared to when fetching node data from the memory 304. This means that fewer reads are performed to fetch data from the memory 304 which can lead to increased performance of the ray tracing system 300, e.g. when memory bandwidth is the limiting factor to the performance of the ray tracing system 300.

However, if we simply packed every node for a sub tree into a larger data block, there is a chance that rays will miss the first level of the sub tree and not need to be tested for intersection with the nodes in the next level. If this occurs a lot of bandwidth is wasted because a larger data block comprising data for many nodes was fetched from the memory 304 but only a few of the nodes were used in the intersection testing.

Therefore, rather than storing larger data blocks, the inventors have realised that data defining regions represented by parent nodes does not need to be explicitly stored in a data block if data defining the regions represented by their children is stored in the data block. In other words, parent nodes need not be stored if their children are. In this case the parent nodes are stored as implicitly represented nodes in the data representing the hierarchical acceleration structure. As described above, data defining an AABB represented by an implicitly represented parent node can be inferred by the minimum and maximum components of the AABBs represented by all its children, and can be computed at runtime during an intersection testing phase instead of storing it with the hierarchical acceleration structure determined in an acceleration structure generation phase. The computation cost of inferring the AABB represented by the parent node is amortised over every ray in a packet of rays to be tested for intersection with the AABB, so it is not too expensive, particularly when the rays are relatively coherent so that a relatively large number of rays is included in a packet of rays.

Figure 10A:
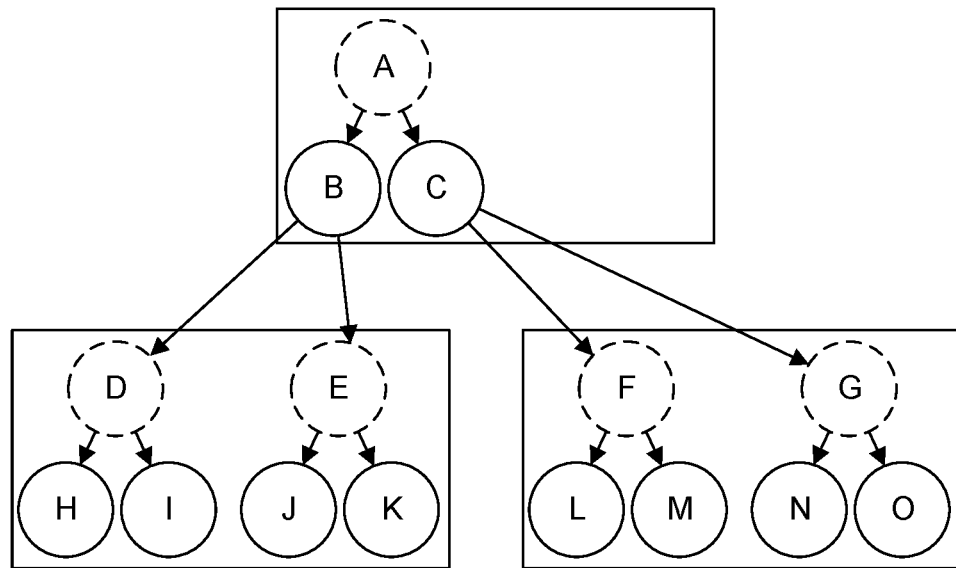
FIG. 10a illustrates a fourth example of storing nodes of a hierarchical acceleration structure in data blocks, wherein some of the nodes are implicitly represented.
Figure 10B:
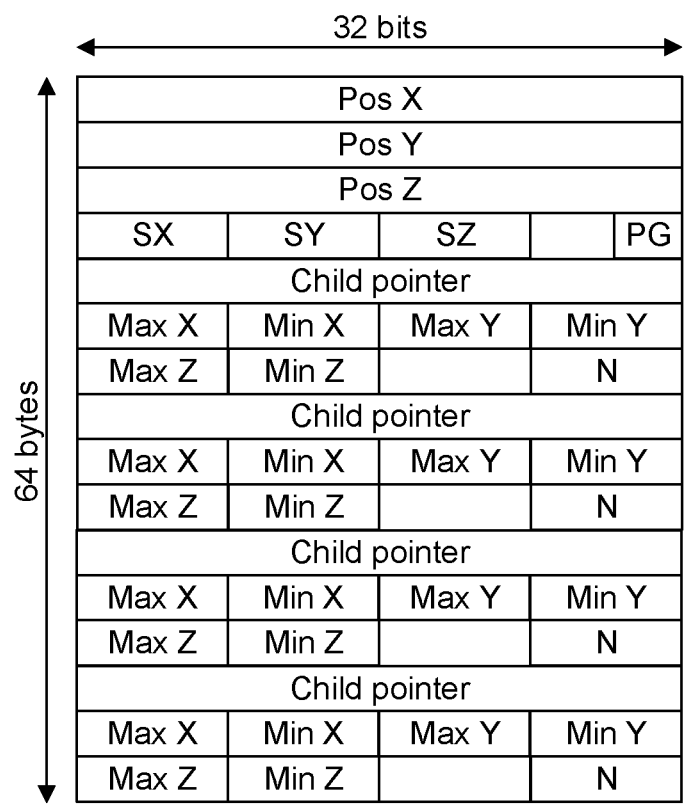

FIG. 10a illustrates an example of storing nodes of a hierarchical acceleration structure in data blocks, wherein some of the nodes are implicitly represented. In FIG. 10a, nodes A, D, E, F and G are shown with dashed lines to indicate that they are implicitly represented nodes. FIG. 10b shows the format of data in a data block in the example shown in FIG. 10a. The only difference between the formats shown in FIGS. 9b and 10b, is that the format shown in FIG. 10b includes an additional field, to represent parent group denoted as "PG". The data in the PG field indicates how to subdivide the nodes into parent groups, i.e. it indicates which of the nodes in the data block share an implicitly represented parent node. In this example, the data for the nodes in the data block is ordered such that nodes which have the same parent are next to each other, so the group (PG) field simply indicates where the nodes in the data block change from having one parent to having another parent. In the examples described herein it is possible to have data blocks with zero, one or two implied parent nodes, and in other examples it would be possible to have data blocks with even more than two implied parent nodes. It is noted that an "implicitly represented node" may also be referred to herein as an "implied node". In the example shown in FIGS. 10a and 10b, a data block stores data for two sub-trees: (i) a first sub-tree comprising implicitly represented node D and its children: nodes H and I; and (ii) a second sub-tree comprising implicitly represented node E and its children: nodes J and K. Nodes D and E are the children of node B. In this example, the data defining the regions represented by four nodes (nodes H, I, J and K) is included in the data block. There are four possible groupings in which the four nodes could be grouped, and one of these four possible groupings is defined using the data in the PG field. In this example, the PG field just has two bits to indicate one of four possible groupings (only one of which is shown in FIG. 10a). For example, if PG has a first value (e.g. 00) then there are no implicitly represented nodes represented by the data in the data block; if PG has a second value (e.g. 01) then there is one implicitly represented node represented by the data in the data block which is the parent of nodes I, J and K; if PG has a third value (e.g. 10) then there are two implicitly represented nodes (e.g. D and E) represented by the data in the data block, wherein one of the implicitly represented nodes (e.g. node D) is the parent of nodes H and I and the other of the implicitly represented nodes (e.g. node E) is the parent of nodes J and K; and if PG has a fourth value (e.g. 11) then there is one implicitly represented node represented by the data in the data block which is the parent of nodes H, I and J. It is noted that in the example shown in FIG. 10a the PG field would have the third value (e.g. 10).

In other examples, the data in the PG field may have a different format. For example, a PG indication may be used for each implicitly represented parent node, and the value of the PG indication for an implicitly represented parent node may be the number of children it has, i.e. the number of nodes in its "parent group". In this example, the groupings of the nodes are allowed to span more than one data block. For example (which is not the example shown in FIG. 10a), a data block could include two PG values with values of two and three. This could mean that one implicitly represented node has children H and I, and another implicitly represented node has children J, K and L. The data block includes the data defining the regions represented by nodes H, I, J and K, but the data defining the region represented by node L is included in the next data block. Therefore the "parent group" for the second implicitly represented node spans into another data block. Each parent group just follows on from the previous parent group, so the nodes are ordered into parent groups when they are written into the data blocks. The format in this example may allow the data to be packed more tightly into the data blocks, but it adds complexity into the system when determining how to pack and unpack the data from the data blocks.

It is noted that the example shown in FIGS. 10a and 10b encodes the larger sub-tree comprising nodes A to O (i.e. fifteen nodes) with just three 64-byte data blocks.

As described above, a data block may comprise data representing one or more sub-trees (e.g. the sub-tree with nodes D, H and I, and the sub-tree with nodes E, J and K) within the hierarchical acceleration structure. Each of the sub-trees comprises one or more nodes at a plurality of levels within the hierarchical acceleration structure. The data block comprises: (i) data defining the regions represented by the nodes at the lowest level of a sub-tree (e.g. for nodes H, I, J and K), and (ii) data indicating how the nodes of a sub-tree are linked. The "lowest level" of a sub-tree is the level of the sub-tree that is furthest from the root node of the hierarchical acceleration structure.

In the example shown in FIG. 10a, at least one node of a sub-tree which is at a level above the lowest level of the sub-tree is an implicitly represented node which is implicitly represented by the data in the data block. For example, the node D is implicitly represented by the data in the data block. Data defining the at least one region represented by the respective at least one implicitly represented node (e.g. node D) is not explicitly stored in the data block but can be inferred from: (i) at least some of the data defining the regions represented by at least some of the nodes at the lowest level of the sub-tree (e.g. nodes H and I which are the children of node D), and (ii) at least some of the data indicating how the nodes of the sub-tree are linked (e.g. the G data indicating that nodes H and I are the children of node D).

In this example, a data block comprises data defining regions which are represented by nodes having a shared ancestor in the hierarchical acceleration structure. For example, the shared ancestor may be a shared parent, a shared grandparent or a shared great grandparent in the hierarchical acceleration structure. In the example shown in FIG. 10a, a data block comprises data defining the regions which are represented by nodes H, I, J and K, which have a shared grandparent: node B. As described above, the data block comprises an indication of a common origin region using the data in the Pos X, Pos Y, Pos Z, SX, SY and SZ fields. The data in the data block defining the regions which are represented by nodes (e.g. nodes H, I, J and K) having a shared ancestor (e.g. node B) in the hierarchical acceleration structure comprises, for each of the nodes (e.g. nodes H, I, J and K) having the shared ancestor (e.g. node B), one or more offsets from the common origin region. For example, the common origin region may represent the region represented by the shared ancestor (e.g. node B).

As described above, the data representing the hierarchical acceleration structure is stored in the memory 304, and can be read from the memory 304 for use by the intersection testing module 308 for performing intersection testing in the ray tracing system 300. Furthermore, in examples described above, the size of a data block matches the minimum burst size of the memory 304. For example, the size of a data block and the minimum burst size of the memory 304 may be 64 bytes.

In FIG. 10a, nodes A, D, E, F and G are all implicitly represented, i.e. data defining the regions represented by these nodes is not explicitly stored and may be computed (i.e. inferred) during runtime in intersection testing if they are needed. In the example shown in FIG. 10a the nodes of every other level are implicitly represented nodes. In other examples, the nodes of different levels may be implicitly represented. In some examples, nodes of two consecutive levels of the hierarchical acceleration structure may be implicitly represented, such that the data for some nodes in a block could be used to infer the data for their parents, and their grandparents. There are lots of factors to trade off when considering which nodes to represent implicitly, e.g. how much data you have to read to decode the data block(s), the hardware cost of generating implicitly represented nodes, and the cost of testing rays for intersection with the nodes. For example, a grandparent node might have between 4 and 16 grandchildren, so if the grandparent node were implicitly represented then all of the grandchildren would need to be considered to infer an AABB for the grandparent node. This extra complexity in inferring the regions represented by implicitly represented nodes may outweigh the benefits of not having to explicitly store the data defining the regions represented by the implicitly represented nodes. Therefore, the decision as to which nodes to implicitly represent in the data representing the hierarchical acceleration structure is an implementation decision which may be different in different implementations.

The examples described in detail above explain how data defining the regions represented by implicitly represented nodes does not need to be explicitly included in the data that is stored to represent a hierarchical acceleration structure. This reduces the amount of data that is used to represent the hierarchical acceleration structure, which can reduce the amount of data that passes between the ray tracing unit 302 and the memory 304, i.e. the memory bandwidth is reduced.

We now go on to describe in detail examples in which a sub-tree can be flattened.

For example, a sub-tree can be flattened by the processing module 306 during the construction of the hierarchical acceleration structure. The branching factors of the nodes of a sub-tree affect the number of intersection tests that are performed by the intersection testing module 308 when performing intersection testing by traversing the hierarchical acceleration structure. The branching factors of the nodes of the sub-tree also affect the amount of data that passes between the ray tracing unit 302 and the memory 304 (i.e. it affects the memory bandwidth). When the data blocks have a format that can store a fixed number of nodes, where the fixed number is greater than one, the memory bandwidth cost does not increase every time a node is added to the hierarchical acceleration structure; instead the memory bandwidth cost increases when we add a data block, so it can be beneficial in terms of keeping the memory bandwidth low to keep the average number of nodes per data block high, e.g. close to the fixed number of nodes that can be included in a data block. In other words, it can be beneficial to populate most (e.g. all) of the slots in the data blocks.

As described above, when determining a suitable branching factor, there is a trade-off to be made between reducing the number of intersection tests and reducing memory bandwidth. The processing module 306 is aware of the format of the data blocks and can balance the goals of this trade-off when it determines the nodes of the hierarchical acceleration structure, e.g. in step S402. The result is that the branching factor of the nodes near the root of the hierarchical acceleration structure is relatively low (e.g. the branching factor may be two for nodes near the root node, such that the hierarchy is more binary near the root) and the branching factor of the nodes near the leaves of the hierarchical acceleration structure is relatively high (e.g. the branching factor may be greater than two (e.g. four or more) for nodes near the leaf nodes, such that the hierarchy is wider near the leaves). The nodes near the root have the largest impact on the number of intersection tests that are performed because more rays will be tested for intersection with nodes near the root than with nodes near the leaves. Furthermore, large packets of rays can be built by the scheduler 312 for testing against nodes near the root, so memory bandwidth is less of an issue because the bandwidth cost associated with fetching the node data can be amortised over a large number of rays. Therefore, in terms of balancing the trade-off between reducing the number of intersection tests and reducing the memory bandwidth, it makes sense to have a lower branching factor (e.g. a branching factor of two) for nodes near the root node. In contrast, the nodes near the leaves have the smallest impact on the number of intersection tests that are performed because fewer rays will be tested for intersection with nodes near the leaves than with nodes near the root. Furthermore, smaller packets of rays can be built by the scheduler 312 for testing against nodes near the leaves, so memory bandwidth is more of an issue because the bandwidth cost associated with fetching the node data can only be amortised over a relatively small number of rays. Therefore, in terms of balancing the trade-off between reducing the number of intersection tests and reducing the memory bandwidth, it makes sense to have a higher branching factor (e.g. a branching factor of four or more) for nodes near the leaves.

Figure 11A:
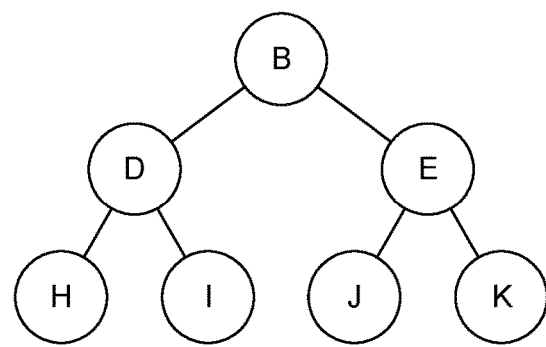
FIG. 11a illustrates a sub-tree within a hierarchical acceleration structure.
Figure 11B:
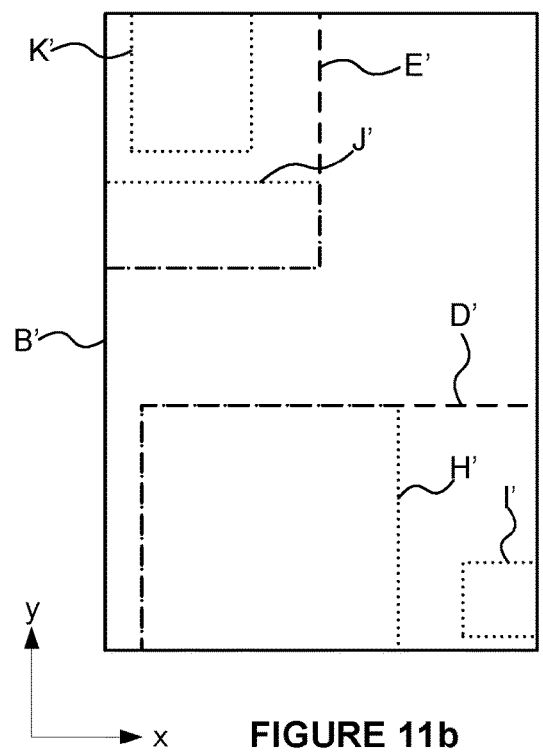

FIG. 11a illustrates a sub-tree within the hierarchical acceleration structure shown in FIG. 2b. FIG. 11b shows the regions within the scene represented by the nodes of the sub-tree illustrated in FIG. 11a. The root node (node B) of the sub-tree represents the region B'. Nodes D and E are the children of node B, where node D represents the region D' shown with dashed lines at the bottom of region B', and node E represents the region E' shown with dashed lines at the top left of region B'. Nodes H and I are the children of node D, where node H represents the region H' shown with dotted lines on the left of region D', and node I represents the region I' shown with dotted lines on the right of region D'. Nodes J and K are the children of node E, where node J represents the region J' shown with dotted lines at the bottom of region E', and node K represents the region K' shown with dotted lines at the top of region E'.

Figure 12A:
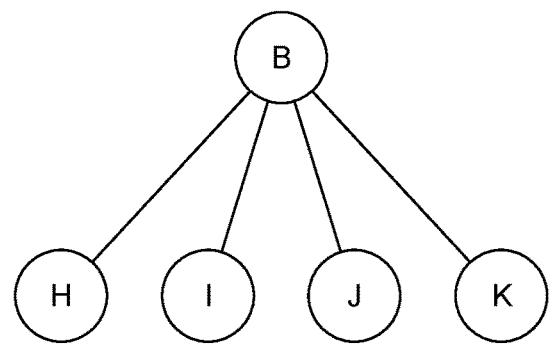
FIG. 12a illustrates the sub-tree of FIG. 11a after it has been flattened.
Figure 12B:
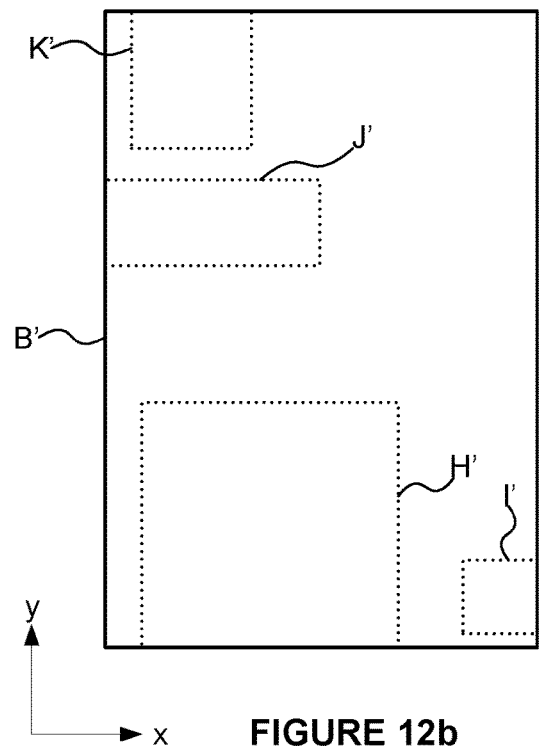

FIG. 12a illustrates the sub-tree of FIG. 11a after it has been flattened, and FIG. 12b shows the regions within the scene represented by the nodes of the flattened sub-tree illustrated in FIG. 12a. The process of omitting a parent node is referred to herein as 'sub-tree flattening', because multiple levels of the sub-tree are collapsed into one flat list. In the example shown in FIGS. 12a and 12b, the nodes D and E have been omitted. When a node is omitted, children of the omitted node become children of the parent of the omitted node. It is noted that the lines in FIGS. 11a and 12a represent parent-child relationships rather than actual pointers stored in the data blocks. In FIGS. 12a and 12b, the root node (node B) of the sub-tree represents the region B'. Nodes H, I, J and K are the children of node B. Node H represents the region H' shown with dotted lines towards the bottom left of region B'; node I represents the region I' shown with dotted lines towards the bottom right of region B'; node J represents the region J' shown with dotted lines on the left of region B'; and node K represents the region K' shown with dotted lines towards the top left of region B'.

The processing module 306 can decide whether or not to flatten the sub-tree (e.g. whether or not to omit nodes D and E) when the hierarchical acceleration structure is generated based one or more heuristics. For example, the expected number of intersection tests that will be performed for a sub-tree can be estimated using a Surface Area Heuristic (SAH), defined as:

$$SAH = \sum_{n \in N} \frac{a(n)}{a(r)} \cdot c(n).$$

This equation can be adapted to define a Bandwidth Heuristic (BWH) as:

$$BWH = \sum_{n \in N} \frac{a(n)}{a(r)} \cdot b(n).$$

The bandwidth heuristic (BWH) can be used to estimate the expected number of data blocks that are fetched from memory during intersection testing. In these equations, N is the set of nodes in the sub-tree or in the hierarchical acceleration structure, n is a node of the set N, r is the root node of the hierarchical acceleration structure, a(n) is the surface area of node n, a(n)/a(r) represents the probability of a ray hitting node n given that it hit the root node r, c(n) is the number of children of node n and b(n) is the number of data blocks required to pack the children of node n.

Using these two heuristics (SAH and BWH) the processing module 306 can compare the sub-tree cost (in terms of the number of intersection tests and memory bandwidth) between the sub-trees shown in FIGS. 11a and 12a, i.e. with and without the nodes D and E, to determine whether or not it would be better to omit the nodes D and E, i.e. whether or not it would be better to flatten the sub-tree.

The surface area heuristic (SAH) and the bandwidth heuristic (BWH) are measured across all nodes in the hierarchy, but small changes to the hierarchy can be evaluated locally because they only affect the score of a few nodes. Therefore, when considering whether or not to flatten a sub-tree, it is sufficient for the set of nodes N to include the nodes of the sub-tree, and not necessarily other nodes of the hierarchical acceleration structure.

For example, the SAH for the unflattened sub-tree shown in FIG. 11a can be calculated as $$SAH = 2\left(\frac{a(B)}{a(r)}\right) + 2\left(\frac{a(D)}{a(r)}\right) + 2\left(\frac{a(E)}{a(r)}\right),$$

and the SAH for the flattened sub-tree shown in FIG. 12a can be calculated as $$SAH = 4\left(\frac{a(B)}{a(r)}\right),$$

where node A is the parent of node B. Therefore, if $2a(B) > 2a(D) + 2a(E)$ then the estimated number of intersection tests would be higher for the flattened sub-tree shown in FIG. 12a than for the unflattened sub-tree shown in FIG. 11a. However, if $2a(B) < 2a(D) + 2a(E)$ then the estimated number of intersection tests would be lower for the flattened sub-tree shown in FIG. 12a than for the unflattened sub-tree shown in FIG. 11a. The bandwidth cost depends upon how the nodes are stored in the data blocks. If, for example, the nodes D and E are stored as implicitly represented nodes as shown in FIG. 10a then the bandwidth cost would be the same for the unflattened sub-tree shown in FIG. 11a and for the flattened sub-tree shown in FIG. 12a. The processing module 106 uses these two heuristics to determine whether or not to flatten the sub-tree.

In examples described herein, the flattening of a sub-tree can be performed dynamically, e.g. during an intersection testing phase of the rendering, rather than during an acceleration structure building phase of the rendering. For example, the multi-level tree format of the data blocks means that nodes from multiple levels of the hierarchical acceleration structure are received together, which means that the intersection testing module 308 can perform sub-tree flattening at runtime. In particular, the intersection testing module 308 can receive a sub-tree comprising a particular node and all of its children. The intersection testing module 308 can dynamically decide whether to test the particular node during intersection testing or whether to just test the children of that particular node. The decision is made based on current system conditions, e.g. based on what is the current bottleneck in the ray tracing system 300, and/or based on whether some of the node testers will be idle if the particular node is tested. In this way, the topology of the sub-tree being traversed can be changed during runtime (i.e. during intersection testing) to suit the system's needs (e.g. to suit the current conditions in the ray tracing system 300).

Bottlenecks in the system can depend heavily on the distribution of the rays to be tested for intersection. In particular, as described above, the intersection testing process usually has one of two bottlenecks which limits the rate at which the intersection testing can be performed: either (i) the memory bandwidth is the limiting factor, e.g. the rate at which data representing parts of the acceleration structure can be retrieved from memory 304 to be tested against rays is the limiting factor, or (ii) the throughput of the intersection testing module 308 is the limiting factor, e.g. the rate at which the intersection testing module 308 can perform the intersection testing operations is the limiting factor. Which of these two factors is the limiting factor will depend upon conditions (e.g. operating conditions) in the ray tracing system. For example, if the rays to be tested for intersection are relatively coherent then a relatively large number of rays will be tested for intersection with the same region in the scene at the same time; whereas if the rays to be tested for intersection are relatively incoherent then a relatively small number of rays will be tested for intersection with the same region in the scene at the same time. Rays are "coherent" if they are submitted for intersection testing at temporally close times and have similar origins and similar directions. If the rays are relatively coherent, the number of rays which are grouped together into a packet by the scheduler 312 to be tested for intersection with a particular region in the scene tends to be larger than if the rays are relatively incoherent. Therefore, if the rays are relatively coherent then a larger number of rays is tested against a node each time the node data for the node is fetched from the memory 304 than if the rays are relatively incoherent. Therefore, for relatively coherent rays, the memory bandwidth cost of fetching the node data from the memory 304 is reduced per-ray, but the testing cost of performing intersection testing may be independent of the ray distribution. As such, when the rays are relatively coherent, the limiting factor is likely to be the throughput of the intersection testing module 308, and in this case a relatively low number of the testing blocks 324 tend to be idle in any given processing cycle; whereas when the rays are relatively incoherent, the limiting factor is likely to be the memory bandwidth, and in this case a relatively high number of the testing blocks 324 tend to be idle in any given processing cycle.

The ray tracing system 300 (e.g. the node processing logic 320) can monitor both the memory bandwidth and the node tester compute throughput, to determine what is limiting the throughput of the intersection testing module 308. Given this information, the node processing logic 320 can make an informed decision about whether the intersection testing module 308 should test a particular parent node, or skip it entirely. As described above, if the rays are incoherent, the testing blocks 324 are likely not being fully utilised, so the testing in respect of a particular parent node can be skipped, and instead all of its children can be tested. It is likely that some of the tester slots would have been idle anyway if the particular parent node was tested for intersection, and the node data for the children of the particular parent node was already fetched from the memory 304, so testing the children rather than the particular parent node means that the testing advances further down the hierarchical acceleration structure for free (i.e. without incurring any extra latency). The term "tester slot" is used here to refer to one of the testing blocks 324 in a particular processing cycle. In contrast, if the rays are coherent, it is less likely that tester slots would be idle, and the throughput of the intersection testing module 308 is likely to be the limiting factor, so it is beneficial to minimise the number of intersection tests that need to be performed, so it usually makes sense to test the particular parent node for the chance of avoiding having to test all of its children.

Monitoring subsystem utilisation (e.g. the utilisation of the testing blocks 324, e.g. by monitoring how many of the testing blocks 324 are idle) and dynamically choosing to flatten sub-trees can improve the performance of the ray tracing system 300 without requiring prior knowledge about ray distribution during tree construction performed by the processing module 306.

Figure 13:
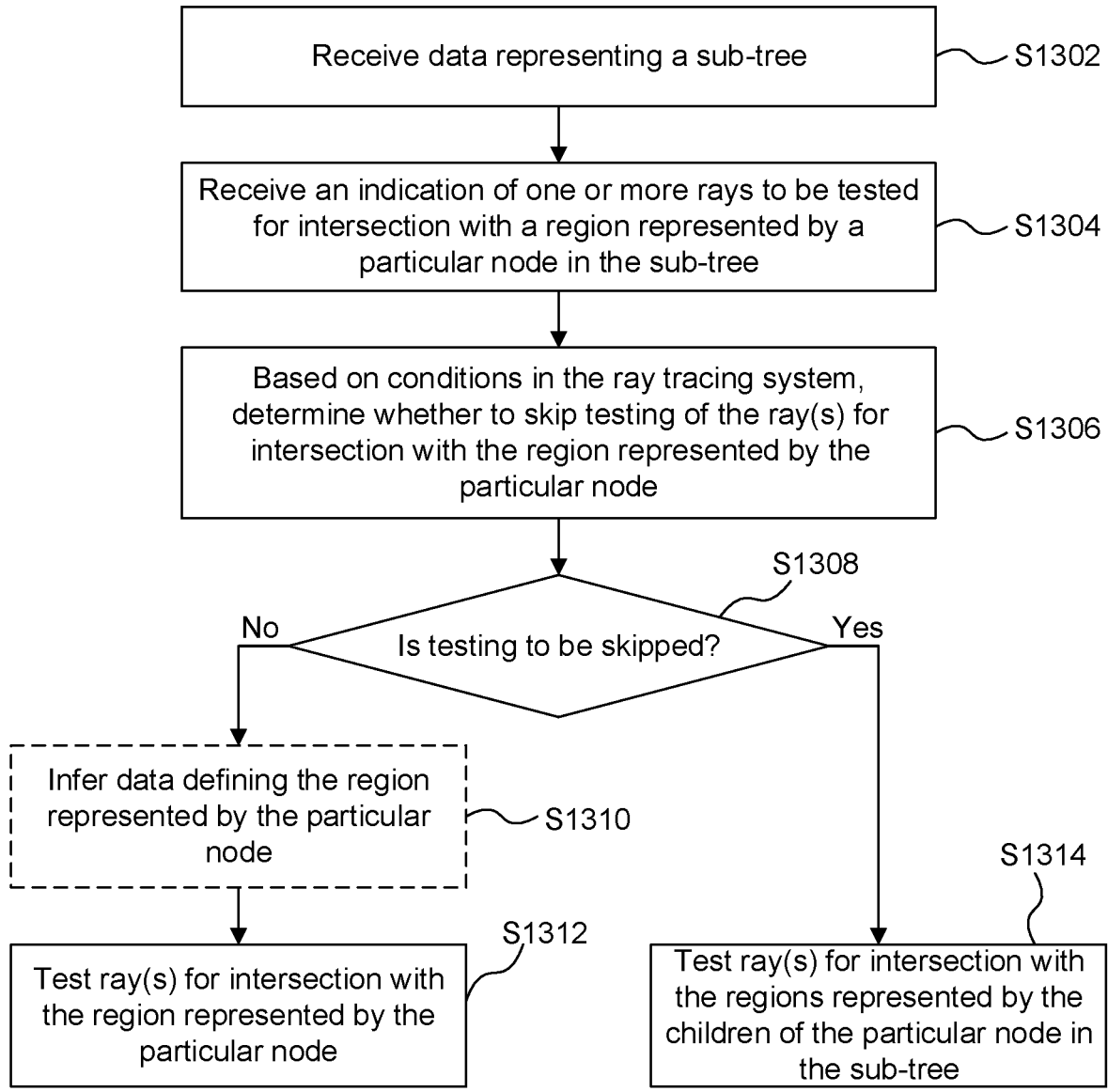
FIG. 13 is a flow chart for a second method of performing intersection testing in a ray tracing system.

FIG. 13 is a flow chart for a method of performing intersection testing in the ray tracing system 300. In step S1302 the intersection testing module 308 (e.g. the receiving logic 316) receives data representing part of a hierarchical acceleration structure (e.g. a sub-tree as shown in FIG. 11a). This data is received from the memory 304. As described above, the node data for the sub-tree is stored in the local memory 318.

In step S1304 the intersection testing module 308 (e.g. the receiving logic 316) receives an indication of one or more rays to be tested for intersection with a region represented by a particular node of the sub-tree. For example, the particular node may be node D of the sub-tree shown in FIG. 11a. The sub-tree comprises descendants (e.g. the children or grandchildren) of the particular node. For example, the sub-tree shown in FIG. 11a comprises nodes H and I which are the children of node D. As described above, a packet of rays to be tested for intersection with the region represented by the particular node may be received at the receiving logic 316 either from the memory 304 or from the request queue 314. It is noted that the receiving logic 316 may be implemented as multiple distinct modules, e.g. a first module for receiving the node data representing a sub-tree, and a second module for receiving the ray data indicating one or more rays to be tested for intersection.

In step S1306 the node processing logic 320 determines, based on conditions in the ray tracing system 300, whether testing of the one or more rays for intersection with the region represented by the particular node of said sub-tree is to be skipped. In other words, the node processing logic 320 determines, based on conditions in the ray tracing system 300, whether to flatten the sub-tree by omitting the particular node.

For example, the node processing logic 320 may monitor an amount of data that is received representing parts of the hierarchical acceleration structure. In other words, the node processing logic 320 may monitor the memory bandwidth. Furthermore, the node processing logic 320 may monitor a processing load on the testing blocks 324 of the intersection testing module 308. The monitored amount of data that is received from the memory 304 and the monitored processing load on the testing blocks 324 represent conditions in the ray tracing system 300 which may be used in step S1306 to determine whether testing of the one or more rays for intersection with the region represented by the particular node of said sub-tree is to be skipped.

In some examples, the node processing logic 320 may determine whether testing of the one or more rays for intersection with the region represented by the particular node of said sub-tree is to be skipped by determining an indication of how many of the testing blocks 324 of the intersection testing module 308 would be idle if the one or more rays are tested for intersection with the region represented by the particular node of said sub-tree, and comparing the determined indication to a threshold. For example, the threshold may be equal to (or greater than) one less than the number of children that the particular node has. If the number of testing blocks 324 that would be idle if the one or more rays are tested for intersection with the region represented by the particular node of said sub-tree is above the threshold then the testing may be skipped for the particular node, and the children of the particular node can be tested instead. For example, node D has two children (nodes H and I). If the node processing logic 320 determines that if node D were tested for intersection in a particular processing cycle then one or more of the testing blocks 324 would be idle during the particular processing cycle, then the testing in respect of node D can be skipped and nodes H and I can be tested for intersection instead. This allows the intersection testing process to advance a level down the sub-tree for free.

The conditions of the ray tracing system on which the node processing logic 320 bases its decision can be different in different implementations, and may comprise one or more of:
 a number of rays to be tested for intersection with the region represented by the particular node of said sub-tree;
 a level of coherence of rays to be tested for intersection;
 a processing load on the testing blocks of the intersection testing module;
 an amount of work in the test queue 322;
 a number of testing blocks of the intersection testing module; and
 an amount of data received from the memory 304.

Intersection testing is performed (in either step S1312 or S1314) for the one or more rays, in accordance with said determination, using one or more of the testing blocks 324 of the intersection testing module 308. If the testing of the particular node (e.g. node D) is not to be skipped then the method passes from step S1308 to S1312. Between steps S1308 and S1312 is a step S1310 which is described below, which is performed if the particular node is an implicitly represented node, but is not performed if the particular node is not an implicitly represented node.

In step S1312 one or more of the testing blocks 324 test the respective one or more rays for intersection with the region represented by the particular node (e.g. node D) of said sub-tree. As described above, methods for testing a ray for intersection with a region (e.g. an AABB) are known in the art, and the specifics of these methods are beyond the scope of this disclosure. If a ray intersects the region represented by the particular node (e.g. node D) then the ray is tested for intersection with the children of the particular node (e.g. nodes H and I). Since the node data defining the regions represented by nodes H and I is stored in the local memory 318, the ray can be tested for intersection with the children (e.g. nodes H and I) without further data being fetched from the memory 304. If a ray misses the region represented by the particular node (e.g. node D) then the ray is not tested for intersection with the children of the particular node (e.g. nodes H and I).

If the testing of the particular node (e.g. node D) is to be skipped then the method passes from step S1308 to S1314. In step S1314 one or more of the testing blocks 324 test the respective one or more rays for intersection with regions represented by descendants (e.g. nodes H and I) of the particular node (e.g. node D) at a particular level in the sub-tree, thereby skipping the testing of the one or more rays for intersection with the region represented by the particular node (e.g. node D) of said sub-tree. Therefore, if the node processing logic 320 determines that testing of one or more rays for intersection with the region represented by the particular node of said sub-tree is to be skipped, then the one or more rays are not tested for intersection with the region represented by the particular node of said sub-tree.

Following step S1312 or S1314, the testing blocks 324 can each output the result of the intersection tests they have performed to the results processor 326. The results processor 326 processes the results of the intersection tests. Specifically, if a ray has been found to not intersect the node it was being tested against, the results processor 326 does not schedule intersection tests for that ray in respect of the child nodes of the node which was not intersected. If the results processor 326 determines that a ray has intersected a node it was being tested against, that ray is output from the intersection testing module 308 back to the scheduler 312, where it will be grouped into a packet and scheduled for intersection testing in respect of a child node of the intersected node.

The process described above with reference to steps S1302 to S1314 is repeated iteratively until the rays have no more hits. In response to an intersection of a ray with a leaf node, object(s) within that leaf node (e.g. triangular primitives) are each scheduled for intersection testing with the ray. As described above, the intersection testing module 308 may comprise object testing blocks (not shown in FIG. 3) configured to perform intersection tests for the rays that intersect a leaf node in respect of the object(s) within that leaf node, and a person skilled in the art would know how to test a ray for intersection with a triangular primitive, so the details of this process are not described in detail herein. If the result of all the intersection testing for a ray is that the ray does not intersect with any objects in the scene then a 'miss' result is returned and can be processed accordingly. If the result of all the intersection testing for a ray is that the ray intersects with a single object then data for this intersection can be returned with a 'hit' result and processed accordingly. If the result of all the intersection testing for a ray is that the ray intersects with more than one object then the intersection distances for the intersections (i.e. the distances from the ray origin to the intersection points) are compared to find the 'closest hit', i.e. the intersection point closest to the ray origin. Data for this closest hit intersection can be returned with a 'hit result' and processed accordingly. When a 'hit' result is determined, data relating to the intersection can be determined by the object testing blocks, e.g. an indication of the position of the intersection on the intersected primitive (e.g. as barycentric co-ordinates) and an indication of a distance of the intersection from the ray origin.

The results of the intersection testing (e.g. the hit results) are passed to the processing logic 310. The processing logic 310 executes one or more shader programs to process results of the intersection testing to determine rendered values representing the image of the scene. In this way, the effects of the intersections can be determined, i.e. the intersection testing results are used for determining rendered values representing the image of the scene. Therefore, results of testing the one or more rays for intersection are used for determining rendered values representing the image of the scene.

Figure 14A:
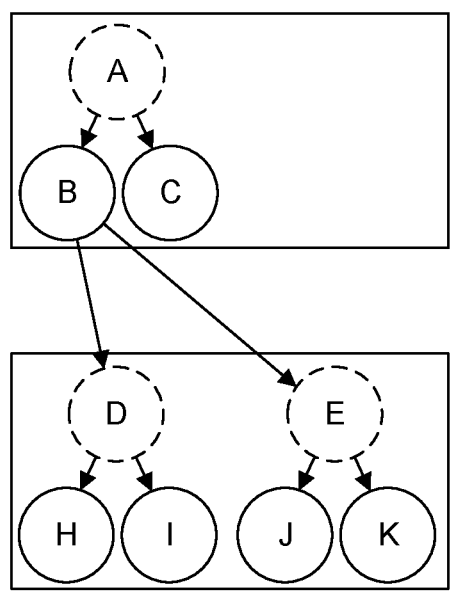
FIG. 14a illustrates a sub-tree of nodes within a hierarchical acceleration structure being stored in data blocks, wherein some of the nodes are implicitly represented.
Figure 14B:
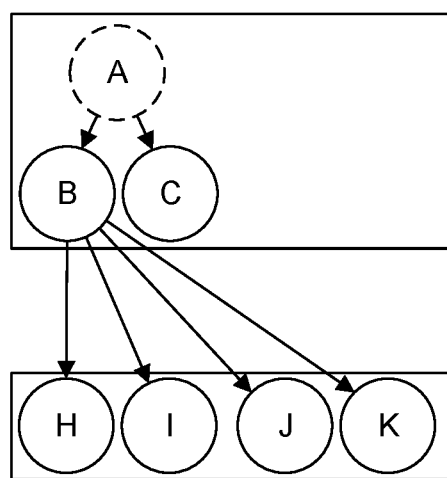
FIG. 14b illustrates the sub-tree of FIG. 14a after it has been flattened.

In some examples, the particular node is an implicitly represented node. For example, the hierarchical acceleration structure may include the nodes shown in FIG. 14a. FIG. 14a shows how the different nodes are stored in data blocks, with the two squares representing two data blocks. The format of the data blocks may be as described in detail above, e.g. as described above with reference to FIGS. 10a and 10b. In the example shown in FIG. 14a the nodes A, D and E are implicitly represented nodes. FIG. 14b illustrates the hierarchical acceleration structure shown in FIG. 14a after a sub-tree within the hierarchical acceleration structure has been flattened. In this example, the implicitly represented nodes D and E have been omitted to thereby flatten the sub-trees.

In this example, if the node processing logic determines in step S1306 that testing of the one or more rays for intersection with the regions represented by the implicitly represented nodes D and E is not to be skipped, then the method passes from step S1308 to step S1310 in which the node processing logic 320 infers the data defining the regions represented by nodes D and E from the received data. Methods for inferring the data defining a region represented by an implicitly represented node (e.g. using data which defines the regions represented by the descendants (e.g. children or grandchildren) of the particular node at the particular level in the sub-tree) are described in detail above.

If the node processing logic determines in step S1306 that testing of the one or more rays for intersection with the regions represented by the implicitly represented nodes D and E is to be skipped, then the data defining the regions represented by nodes D and E is not inferred. In other words, step S1310 is not performed on the 'Yes' path from the decision in step S1308. In this way, if an implicitly represented node is not needed for intersection testing then the data defining the region represented by the implicitly represented node is not inferred by the intersection testing module 308. Therefore in this case, data is not stored to represent the implicitly represented node (thereby reducing the memory bandwidth and the amount of memory used to store the data representing the hierarchical acceleration structure), and the operations involved in inferring the implicitly represented node are not performed in the intersection testing module 308 and the operations involved in testing rays for intersection with the region represented by the implicitly represented node are not performed in the intersection testing module 308 (thereby reducing the amount of work performed by the intersection testing module 308, which may reduce the latency and power consumption of the intersection testing module 308).

Figure 15:
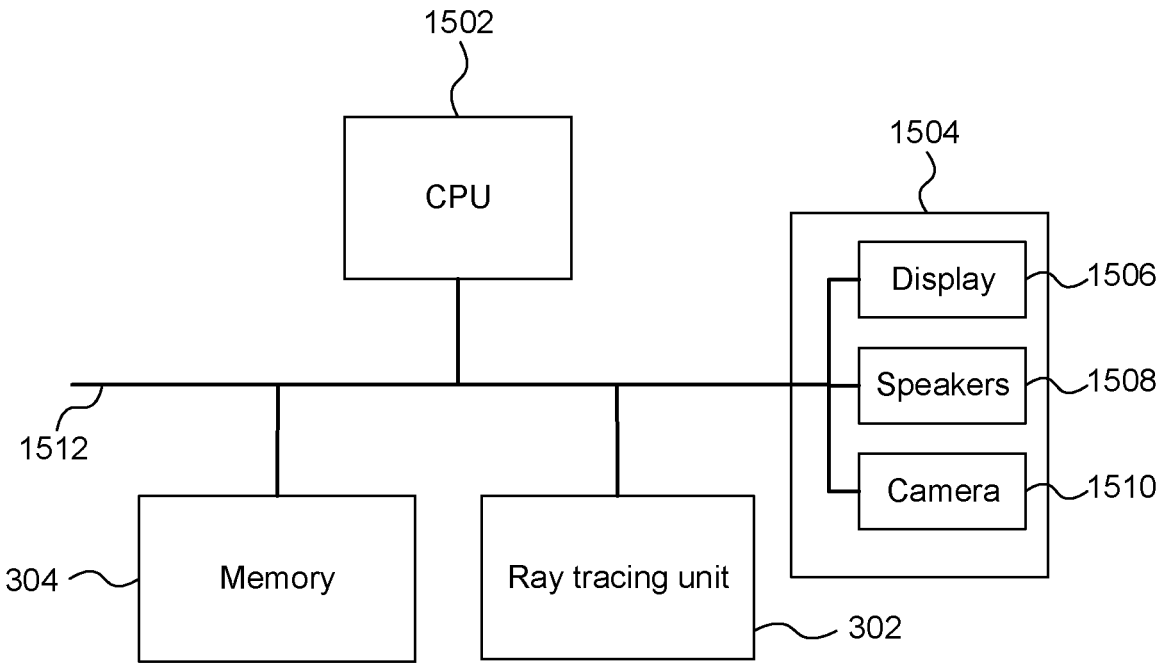
FIG. 15 shows a computer system in which a ray tracing unit is implemented.

FIG. 15 shows a computer system in which the ray tracing systems described herein may be implemented. The computer system comprises a CPU 1502, the memory 304, the ray tracing unit 302 and other devices 1504, such as a display 1506, speakers 1508 and a camera 1510. The components of the computer system can communicate with each other via a communications bus 1512.

The ray tracing system 300 is shown as comprising a number of functional blocks. This is schematic only and is not intended to define a strict division between different logic elements of such entities. Each functional block may be provided in any suitable manner. It is to be understood that intermediate values described herein as being formed by a ray tracing system need not be physically generated by the ray tracing system at any point and may merely represent logical values which conveniently describe the processing performed by the ray tracing system between its input and output.

The ray tracing systems described herein may be embodied in hardware on an integrated circuit. The ray tracing systems described herein may be configured to perform any of the methods described herein. Generally, any of the functions, methods, techniques or components described above can be implemented in software, firmware, hardware (e.g., fixed logic circuitry), or any combination thereof. The terms "module," "functionality," "component", "element", "unit", "block" and "logic" may be used herein to generally represent software, firmware, hardware, or any combination thereof. In the case of a software implementation, the module, functionality, component, element, unit, block or logic represents program code that performs the specified tasks when executed on a processor. The algorithms and methods described herein could be performed by one or more processors executing code that causes the processor(s) to perform the algorithms/methods. Examples of a computer-readable storage medium include a random-access memory (RAM), read-only memory (ROM), an optical disc, flash memory, hard disk memory, and other memory devices that may use magnetic, optical, and other techniques to store instructions or other data and that can be accessed by a machine.

The terms computer program code and computer readable instructions as used herein refer to any kind of executable code for processors, including code expressed in a machine language, an interpreted language or a scripting language. Executable code includes binary code, machine code, bytecode, code defining an integrated circuit (such as a hardware description language or netlist), and code expressed in a programming language code such as C, Java or OpenCL. Executable code may be, for example, any kind of software, firmware, script, module or library which, when suitably executed, processed, interpreted, compiled, executed at a virtual machine or other software environment, cause a processor of the computer system at which the executable code is supported to perform the tasks specified by the code.

A processor, computer, or computer system may be any kind of device, machine or dedicated circuit, or collection or portion thereof, with processing capability such that it can execute instructions. A processor may be any kind of general purpose or dedicated processor, such as a CPU, GPU, System-on-chip, state machine, media processor, an application-specific integrated circuit (ASIC), a programmable logic array, a field-programmable gate array (FPGA), or the like. A computer or computer system may comprise one or more processors.

It is also intended to encompass software which defines a configuration of hardware as described herein, such as HDL (hardware description language) software, as is used for designing integrated circuits, or for configuring programmable chips, to carry out desired functions. That is, there may be provided a computer readable storage medium having encoded thereon computer readable program code in the form of an integrated circuit definition dataset that when processed (i.e. run) in an integrated circuit manufacturing system configures the system to manufacture a ray tracing system configured to perform any of the methods described herein, or to manufacture a ray tracing system comprising any apparatus described herein. An integrated circuit definition dataset may be, for example, an integrated circuit description.

Therefore, there may be provided a method of manufacturing, at an integrated circuit manufacturing system, a ray tracing system as described herein. Furthermore, there may be provided an integrated circuit definition dataset that, when processed in an integrated circuit manufacturing system, causes the method of manufacturing a ray tracing system to be performed.

An integrated circuit definition dataset may be in the form of computer code, for example as a netlist, code for configuring a programmable chip, as a hardware description language defining hardware suitable for manufacture in an integrated circuit at any level, including as register transfer level (RTL) code, as high-level circuit representations such as Verilog or VHDL, and as low-level circuit representations such as OASIS® and GDSII. Higher level representations which logically define hardware suitable for manufacture in an integrated circuit (such as RTL) may be processed at a computer system configured for generating a manufacturing definition of an integrated circuit in the context of a software environment comprising definitions of circuit elements and rules for combining those elements in order to generate the manufacturing definition of an integrated circuit so defined by the representation. As is typically the case with software executing at a computer system so as to define a machine, one or more intermediate user steps (e.g. providing commands, variables etc.) may be required in order for a computer system configured for generating a manufacturing definition of an integrated circuit to execute code defining an integrated circuit so as to generate the manufacturing definition of that integrated circuit.

An example of processing an integrated circuit definition dataset at an integrated circuit manufacturing system so as to configure the system to manufacture a ray tracing system will now be described with respect to FIG. 16.

Figure 16:
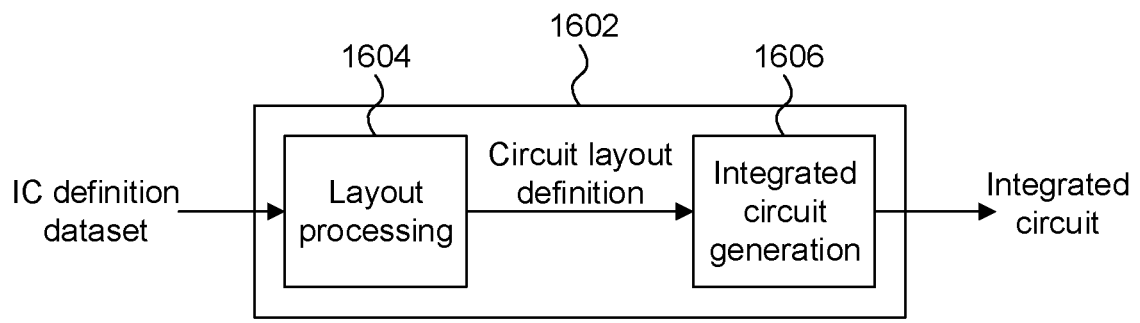
FIG. 16 shows an integrated circuit manufacturing system for generating an integrated circuit embodying a ray tracing system as described herein.

FIG. 16 shows an example of an integrated circuit (IC) manufacturing system 1602 which is configured to manufacture a ray tracing system as described in any of the examples herein. In particular, the IC manufacturing system 1602 comprises a layout processing system 1604 and an integrated circuit generation system 1606. The IC manufacturing system 1602 is configured to receive an IC definition dataset (e.g. defining a ray tracing system as described in any of the examples herein), process the IC definition dataset, and generate an IC according to the IC definition dataset (e.g. which embodies a ray tracing system as described in any of the examples herein). The processing of the IC definition dataset configures the IC manufacturing system 1602 to manufacture an integrated circuit embodying a ray tracing system as described in any of the examples herein.

The layout processing system 1604 is configured to receive and process the IC definition dataset to determine a circuit layout. Methods of determining a circuit layout from an IC definition dataset are known in the art, and for example may involve synthesising RTL code to determine a gate level representation of a circuit to be generated, e.g. in terms of logical components (e.g. NAND, NOR, AND, OR, MUX and FLIP-FLOP components). A circuit layout can be determined from the gate level representation of the circuit by determining positional information for the logical components. This may be done automatically or with user involvement in order to optimise the circuit layout. When the layout processing system 1604 has determined the circuit layout it may output a circuit layout definition to the IC generation system 1606. A circuit layout definition may be, for example, a circuit layout description.

The IC generation system 1606 generates an IC according to the circuit layout definition, as is known in the art. For example, the IC generation system 1606 may implement a semiconductor device fabrication process to generate the IC, which may involve a multiple-step sequence of photo lithographic and chemical processing steps during which electronic circuits are gradually created on a wafer made of semiconducting material. The circuit layout definition may be in the form of a mask which can be used in a lithographic process for generating an IC according to the circuit definition. Alternatively, the circuit layout definition provided to the IC generation system 1606 may be in the form of computer-readable code which the IC generation system 1606 can use to form a suitable mask for use in generating an IC.

The different processes performed by the IC manufacturing system 1602 may be implemented all in one location, e.g. by one party. Alternatively, the IC manufacturing system 1602 may be a distributed system such that some of the processes may be performed at different locations, and may be performed by different parties. For example, some of the stages of: (i) synthesising RTL code representing the IC definition dataset to form a gate level representation of a circuit to be generated, (ii) generating a circuit layout based on the gate level representation, (iii) forming a mask in accordance with the circuit layout, and (iv) fabricating an integrated circuit using the mask, may be performed in different locations and/or by different parties.

In other examples, processing of the integrated circuit definition dataset at an integrated circuit manufacturing system may configure the system to manufacture a ray tracing system without the IC definition dataset being processed so as to determine a circuit layout. For instance, an integrated circuit definition dataset may define the configuration of a reconfigurable processor, such as an FPGA, and the processing of that dataset may configure an IC manufacturing system to generate a reconfigurable processor having that defined configuration (e.g. by loading configuration data to the FPGA).

In some embodiments, an integrated circuit manufacturing definition dataset, when processed in an integrated circuit manufacturing system, may cause an integrated circuit manufacturing system to generate a device as described herein. For example, the configuration of an integrated circuit manufacturing system in the manner described above with respect to FIG. 16 by an integrated circuit manufacturing definition dataset may cause a device as described herein to be manufactured.

In some examples, an integrated circuit definition dataset could include software which runs on hardware defined at the dataset or in combination with hardware defined at the dataset. In the example shown in FIG. 16, the IC generation system may further be configured by an integrated circuit definition dataset to, on manufacturing an integrated circuit, load firmware onto that integrated circuit in accordance with program code defined at the integrated circuit definition dataset or otherwise provide program code with the integrated circuit for use with the integrated circuit.

The implementation of concepts set forth in this application in devices, apparatus, modules, and/or systems (as well as in methods implemented herein) may give rise to performance improvements when compared with known implementations. The performance improvements may include one or more of increased computational performance, reduced latency, increased throughput, and/or reduced power consumption. During manufacture of such devices, apparatus, modules, and systems (e.g. in integrated circuits) performance improvements can be traded-off against the physical implementation, thereby improving the method of manufacture. For example, a performance improvement may be traded against layout area, thereby matching the performance of a known implementation but using less silicon. This may be done, for example, by reusing functional blocks in a serialised fashion or sharing functional blocks between elements of the devices, apparatus, modules and/or systems. Conversely, concepts set forth in this application that give rise to improvements in the physical implementation of the devices, apparatus, modules, and systems (such as reduced silicon area) may be traded for improved performance. This may be done, for example, by manufacturing multiple instances of a module within a predefined area budget.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein. In view of the foregoing description it will be evident to a person skilled in the art that various modifications may be made within the scope of the invention.

What is claimed is:

1. A computer-implemented method of performing intersection testing in a ray tracing system for use in rendering an image of a scene, wherein the ray tracing system comprises an intersection testing module comprising a plurality of testing blocks configured to test a ray for intersection with a region in the scene, the method comprising:
   receiving data representing part of a hierarchical acceleration structure, wherein the hierarchical acceleration structure comprises nodes, each of which represents a region in the scene, wherein the nodes are linked to form the hierarchical acceleration structure, wherein said part of the hierarchical acceleration structure represents a sub-tree within the hierarchical acceleration structure;
   receiving an indication of one or more rays to be tested for intersection with a region represented by a particular node of said sub-tree, wherein the sub-tree comprises descendants of the particular node;
   based on conditions in the ray tracing system, determining whether testing of the one or more rays for intersection with the region represented by the particular node of said sub-tree is to be skipped; and
   testing the one or more rays for intersection, in accordance with said determination, using one or more of the testing blocks of the intersection testing module, wherein said testing the one or more rays for intersection comprises:
     if said determination is that testing of the one or more rays for intersection with the region represented by the particular node of said sub-tree is to be skipped, testing the one or more rays for intersection with regions represented by descendants of the particular node at a particular level in the sub-tree, thereby skipping the testing of the one or more rays for intersection with the region represented by the particular node of said sub-tree.

2. The method of claim 1 wherein said testing the one or more rays for intersection further comprises:
   if said determination is that testing of the one or more rays for intersection with the region represented by the particular node of said sub-tree is not to be skipped, testing the one or more rays for intersection with the region represented by the particular node of said sub-tree.

3. The method of claim 1 wherein the descendants of the particular node at the particular level in the sub-tree are: (i) the children of the particular node in the sub-tree, (ii) the grandchildren of the particular node in the sub-tree.

4. The method of claim 1 wherein said particular node is an implicitly represented node, wherein data defining a region represented by an implicitly represented node is not explicitly included as part of said received data representing the sub-tree but can be inferred from said received data.

5. The method of claim 4 further comprising:
   if said determination is that testing of the one or more rays for intersection with the region represented by the particular node of said sub-tree is not to be skipped, inferring the data defining the region represented by the particular node from the received data, wherein the data defining the region represented by the particular node is not inferred if said determination is that testing of the one or more rays for intersection with the region represented by the particular node of said sub-tree is to be skipped.

6. The method of claim 4 wherein the regions represented by the nodes of the hierarchical acceleration structure are axis-aligned bounding boxes in the scene, wherein the data defining the region represented by the particular node can be inferred from data in said received data which defines the regions represented by the descendants of the particular node at the particular level in the sub-tree, and wherein the data defining the region represented by the particular node can be inferred by determining, in each dimension of the scene, a minimum and a maximum component of the components defining the axis-aligned bounding boxes represented by the descendants of the particular node at the particular level in the sub-tree.

7. The method of claim 1 wherein said received data representing part of the hierarchical acceleration structure comprises data indicating how the nodes of the sub-tree are linked, and wherein the data defining the region represented by the particular node can be inferred from said received data using at least some of the data indicating how the nodes of the sub-tree are linked.

8. The method of claim 1 wherein said receiving data representing part of the hierarchical acceleration structure comprises receiving a data block, wherein the data block comprises data representing the sub-tree within the hierarchical acceleration structure.

9. The method of claim 8 wherein the data block comprises: (i) data defining the regions represented by the descendants of the particular node at the particular level in the sub-tree, and (ii) data indicating how the nodes of the sub-tree are linked.

10. The method of claim 8 wherein the data block comprises data defining regions which are represented by nodes having a shared ancestor in the hierarchical acceleration structure, wherein the data block comprises an indication of a common origin region representing the region represented by the shared ancestor, and wherein the data defining the regions in the data block which are represented by nodes having the shared ancestor in the hierarchical acceleration structure comprises, for each of the nodes having the shared ancestor, one or more offsets from the common origin region, wherein the shared ancestor is a shared parent, a shared grandparent or a shared great grandparent in the hierarchical acceleration structure.

11. The method of claim 8 wherein the hierarchical acceleration structure is built for the scene and stored in a memory before the intersection testing commences for rendering the image of the scene, wherein said receiving data representing part of the hierarchical acceleration structure comprises reading said data representing part of the hierarchical acceleration structure from the memory, wherein the size of the data block matches the minimum burst size of the memory.

12. The method of claim 1 wherein said determining whether testing of the one or more rays for intersection with the region represented by the particular node of said sub-tree is to be skipped is performed dynamically during an intersection testing phase of rendering the image of the scene in the ray tracing system.

13. The method of claim 1 further comprising:
monitoring an amount of data that is received representing parts of the hierarchical acceleration structure; and
monitoring a processing load on the testing blocks of the intersection testing module;
wherein said conditions in the ray tracing system comprise the monitored amount of data and the monitored processing load.

14. The method of claim 1 wherein said determining whether testing of the one or more rays for intersection with the region represented by the particular node of said sub-tree is to be skipped comprises:
determining an indication of how many of the testing blocks of the intersection testing module would be idle if the one or more rays are tested for intersection with the region represented by the particular node of said sub-tree; and
comparing the determined indication to a threshold.

15. The method of claim 1 wherein said conditions in the ray tracing system comprise one or more of:
a number of rays to be tested for intersection with the region represented by the particular node of said sub-tree;
a level of coherence of rays to be tested for intersection;
a processing load on the testing blocks of the intersection testing module;
an amount of work in a queue of work for the testing blocks;
a number of testing blocks of the intersection testing module; and
an amount of data received from a memory from which said data representing part of the hierarchical acceleration structure is read.

16. The method of claim 1 wherein results of said testing the one or more rays for intersection are used for determining rendered values representing the image of the scene.

17. A method of rendering an image of a scene in a ray tracing system comprising:
generating and storing a hierarchical acceleration structure;
performing intersection testing according to the method as set forth in claim 1 using part of the generated hierarchical acceleration structure; and
executing one or more shader programs to process results of the intersection testing to determine rendered values representing the image of the scene.

18. An intersection testing module configured to perform intersection testing in a ray tracing system for use in rendering an image of a scene, the intersection testing module comprising:
receiving logic configured to:
receive data representing part of a hierarchical acceleration structure, wherein the hierarchical acceleration structure comprises nodes, each of which represents a region in the scene, wherein the nodes are linked to form the hierarchical acceleration structure, wherein said part of the hierarchical acceleration structure represents a sub-tree within the hierarchical acceleration structure, and
receive an indication of one or more rays to be tested for intersection with a region represented by a particular node of said sub-tree, wherein the sub-tree comprises descendants of the particular node;
node processing logic configured to determine, based on conditions in the ray tracing system, whether testing of the one or more rays for intersection with the region represented by the particular node of said sub-tree is to be skipped; and a plurality of testing blocks configured to test the one or more rays for intersection, in accordance with said determination made by the node processing logic, wherein the intersection testing module is configured to cause the plurality of testing blocks to test the one or more rays for intersection by:

if said determination made by the node processing logic is that testing of the one or more rays for intersection with the region represented by the particular node of said sub-tree is to be skipped, testing the one or more rays for intersection with regions represented by descendants of the particular node at a particular level in the sub-tree, thereby skipping the testing of the one or more rays for intersection with the region represented by the particular node of said sub-tree.

19. A ray tracing system configured to render an image of a scene, the ray tracing system comprising:

a processing module configured to generate a hierarchical acceleration structure;

an intersection testing module as set forth in claim 18 configured to use part of the generated hierarchical acceleration structure to perform intersection testing; and processing logic configured to execute one or more shader programs to process results of the intersection testing to determine rendered values representing the image of the scene.

20. A computer readable storage medium having stored thereon an integrated circuit definition dataset that, when processed in an integrated circuit manufacturing system, configures the integrated circuit manufacturing system to manufacture an intersection testing module which is configured to perform intersection testing in a ray tracing system for use in rendering an image of a scene, the intersection testing module comprising:

receiving logic configured to:

receive data representing part of a hierarchical acceleration structure, wherein the hierarchical acceleration structure comprises nodes, each of which represents a region in the scene, wherein the nodes are linked to form the hierarchical acceleration structure, wherein said part of the hierarchical acceleration structure represents a sub-tree within the hierarchical acceleration structure, and receive an indication of one or more rays to be tested for intersection with a region represented by a particular node of said sub-tree, wherein the sub-tree comprises descendants of the particular node;

node processing logic configured to determine, based on conditions in the ray tracing system, whether testing of the one or more rays for intersection with the region represented by the particular node of said sub-tree is to be skipped; and a plurality of testing blocks configured to test the one or more rays for intersection, in accordance with said determination made by the node processing logic, wherein the intersection testing module is configured to cause the plurality of testing blocks to test the one or more rays for intersection by:

if said determination made by the node processing logic is that testing of the one or more rays for intersection with the region represented by the particular node of said sub-tree is to be skipped, testing the one or more rays for intersection with regions represented by descendants of the particular node at a particular level in the sub-tree, thereby skipping the testing of the one or more rays for intersection with the region represented by the particular node of said sub-tree.

\* \* \* \* \*